United States Patent
Nakamura

(10) Patent No.: US 6,940,902 B2
(45) Date of Patent: Sep. 6, 2005

(54) CODE QUANTITY ASSIGNMENT DEVICE AND METHOD

(75) Inventor: Takeshi Nakamura, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 411 days.

(21) Appl. No.: 09/877,077

(22) Filed: Jun. 11, 2001

(65) Prior Publication Data

US 2002/0009138 A1 Jan. 24, 2002

(30) Foreign Application Priority Data

Jun. 9, 2000 (JP) .................................... P2000-174064

(51) Int. Cl.⁷ ............................................... H04N 7/12
(52) U.S. Cl. ............................................... 375/240.02
(58) Field of Search .......................... 348/387.1, 699; 375/240.01–240.07, 240.12–240.16, 240.24, 240.26; H04N 7/12

(56) References Cited

U.S. PATENT DOCUMENTS

| | | | | |
|---|---|---|---|---|
| 5,073,820 A | * | 12/1991 | Nakagawa et al. | 375/240.03 |
| 5,500,676 A | * | 3/1996 | Tanaka et al. | 348/387.1 |
| 5,650,860 A | * | 7/1997 | Uz | 375/240.24 |
| 5,949,490 A | * | 9/1999 | Borgwardt et al. | 375/240.05 |
| 6,137,838 A | * | 10/2000 | Miyagoshi et al. | 375/240.26 |
| 6,434,196 B1 | * | 8/2002 | Sethuraman et al. | 375/240.12 |
| 6,509,929 B1 | * | 1/2003 | Ishikawa | 375/240.03 |
| 6,563,549 B1 | * | 5/2003 | Sethuraman | 348/699 |

* cited by examiner

*Primary Examiner*—Richard Lee
(74) *Attorney, Agent, or Firm*—Sughrue Mion, PLLC

(57) ABSTRACT

A code quantity assignment apparatus used for compression encode data storing system is provided. In the apparatus, an image group code quantity assignment device assigns code quantity for every image group so that buffer occupation rate of an image group having a predetermined number of image frames included in a video signal is within the range of predetermined upper limit and lower limit of the rate. Then, a first frame code quantity assignment device assigns code quantity to an initial frame so that the buffer occupation rate of the initial frame within the image group does not exceed the predetermined upper limit of the rate. Further, a second frame code quantity assignment device assigns code quantity to a frame later than the initial frame within the image group, based on the code quantity assigned by the image group code quantity assignment device and first frame code quantity assignment device.

10 Claims, 15 Drawing Sheets

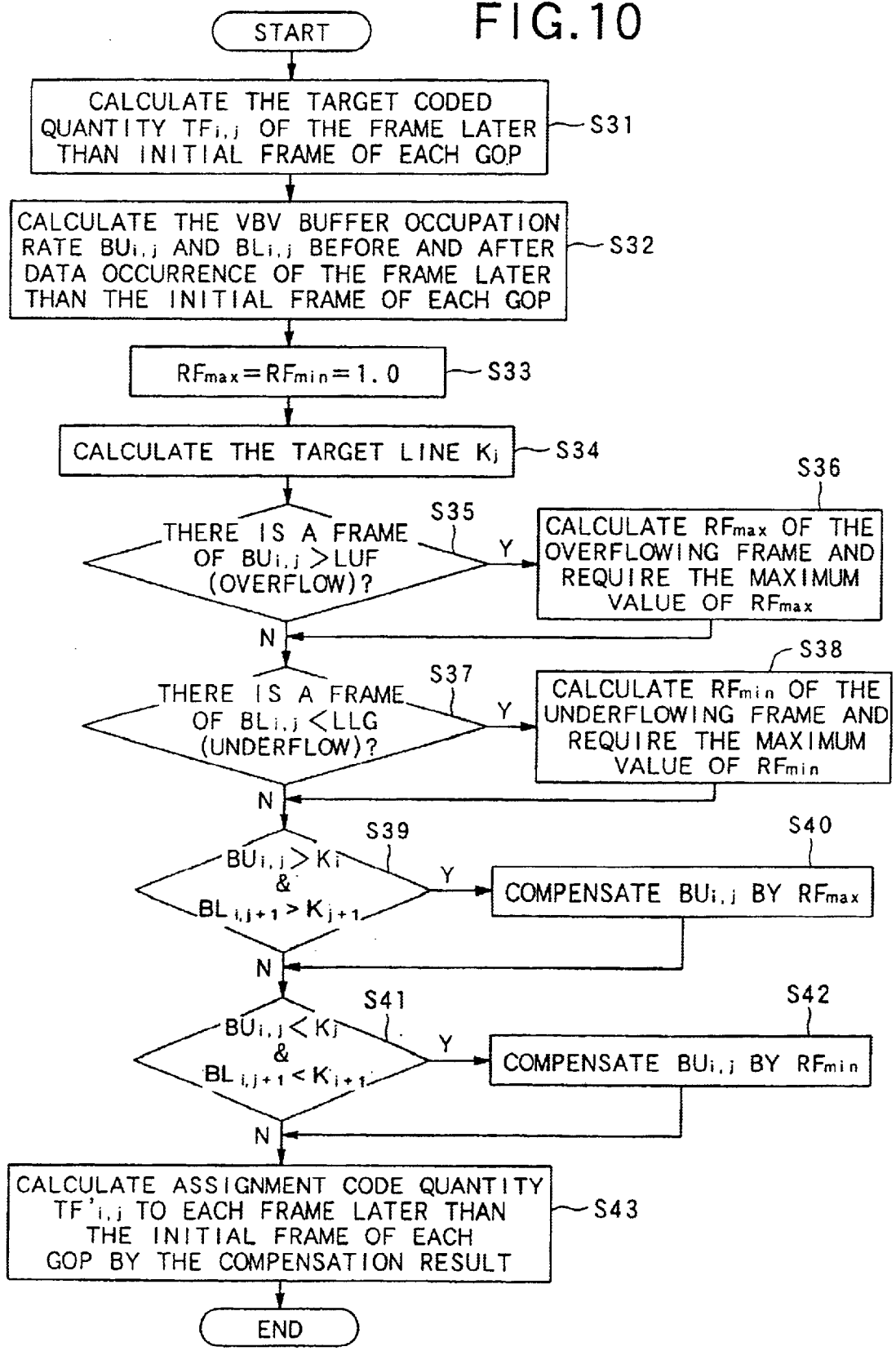

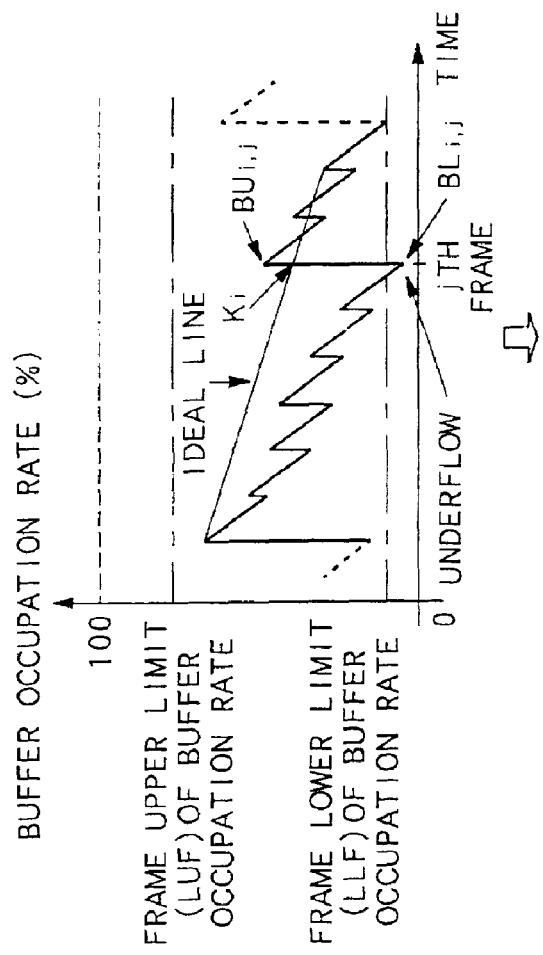
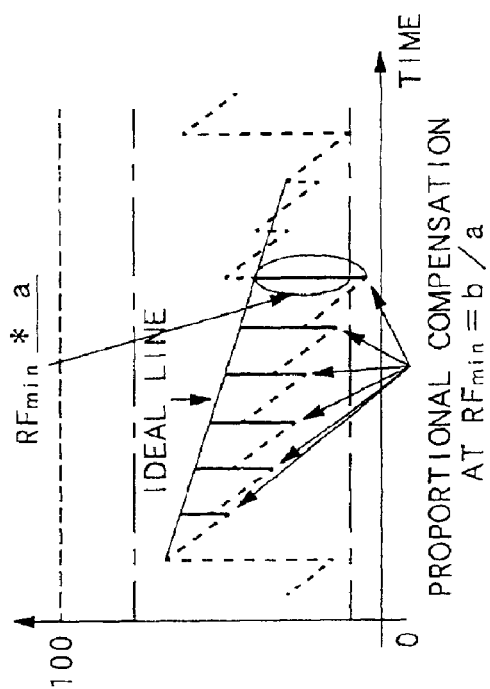
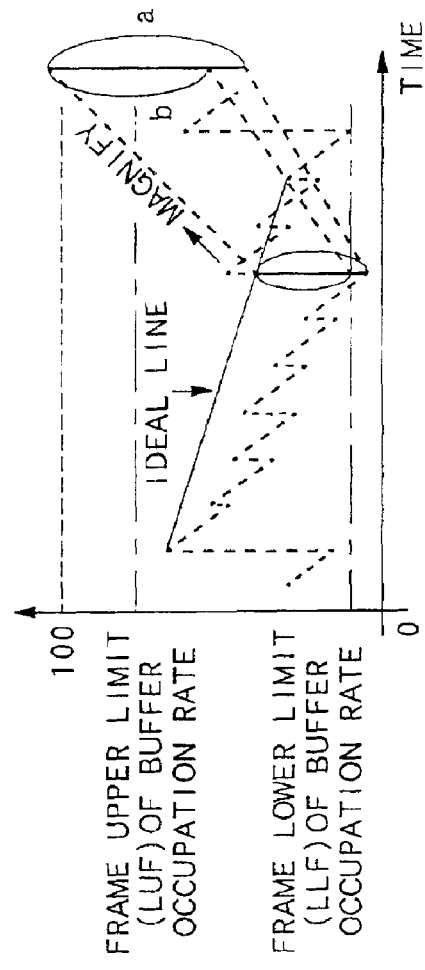

FIG.15

$NG_i$ : THE NUMBER OF FRAMES OF THE iTH GOP $N$ : THE TOTAL OF THE FRAMES $= \sum_{i}^{G} NG_i$ $G$ : THE TOTAL NUMBER OF GOPs $TF_{i,j}$ : THE TARGET CODED QUANTITY OF THE jTH FRAME OF THE iTH GOP $TG_i$ : THE TARGET CODED QUANTITY OF THE iTH GOP $= \sum_{j}^{NG_i} TF_{i,j}$ $T$ : THE TARGET TOTAL CODED QUANTITY $= \sum_{i}^{G} NG_i = \sum_{i}^{G} \sum_{j}^{NG_i} TF_{i,j}$ $SF_{i,j}$ : IMAGE COMPLEXITY INDEX OF THE jTH FRAME OF THE iTH GOP $SG_i$ : IMAGE COMPLEXITY INDEX OF THE iTH GOP $= \sum_{j}^{NG_i} SF_{i,j}$ $S$ : TOTAL IMAGE COMPLEXITY INDEXES $= \sum_{i}^{G} SG_i = \sum_{i}^{G} \sum_{j}^{NG_i} SF_{i,j}$

CODE QUANTITY ASSIGNMENT DEVICE AND METHOD

BACKGROUND OF THE INVENTION

1. Field of the Invention

The present invention relates to a code quantity assignment device and method for encoding a video signal and storing it in a storage medium in compression encode data storing.

2. Description of the Related Art

In the case of storing a digitalized image, into a storage medium such as a DVD-ROM, a CD-ROM, and a hard disk, it is generally compressed and encoded because the data amount becomes extravagant. This coding method includes various compression-coding methods. Especially, a coding method based on the DCT (Discrete Cosine Transform) for performing compression by using such a property that spatial frequency of an image concentrates on low frequency is comparatively used in many cases. The DCT is used in the coding of the international standard such as JPEG (Joint Photographic Coding Experts Group), MPEG (Moving Picture Coding Experts Group) 1, MPEG 2, and MPEG 4.

In the conventional compression-coding device by the MPEG method, it is well known that the coding is controlled by a fixed bit rate coding method, or a variable bit rate coding method.

In the fixed bit rate coding method, the target code quantity of each frame forming a video sequence is constant, regardless of complexity of the image, and the coding is controlled so as to avoid overflow and underflow, while estimating the occupation rate of a decoder buffer at a time of coding.

On the other hand, in the variable bit rate coding method, since the optimum code quantity amount of each frame within a video sequence has been previously assigned based on a previously-obtained index showing the complexity of an image, it is possible to assign the code quantity necessary for each frame and restrain the difference in image quality between frames.

Since the coded quantity of each frame is relative to the image complexity index of the corresponding image, assignment of code quantity of each frame regardless of the image complexity index would cause unevenness to the image quality of each frame. When much more code quantity is required, the code quantity assignment by consideration of the occupation rate of a decoder buffer at a time of encoding would cause deterioration in image quality since it cannot assign a large code quantity to a frame because of a small space of the buffer, and even when a smaller code quantity can assure sufficient image quality, a larger code quantity would be assigned because of a large space of the buffer.

On the other hand, the code quantity assignment of each frame simply based on the image complexity index would cause overflow or underflow in the decoder buffer.

SUMMARY OF THE INVENTION

In consideration of the above problems, the present invention is to provide a device for assigning an optimum code quantity to each frame and its method, based on an image complexity index of each frame forming a video sequence.

The above object of the present invention can be achieved by a code quantity assignment apparatus of the present invention for encoding a video signal and storing the same into a storage medium in compression encode data storing system. The apparatus is provided with: an image group code quantity assignment device for assigning code quantity for every image group so that buffer occupation rate of an image group having a predetermined number of image frames included in a video signal is within the range of predetermined upper limit and lower limit of the buffer occupation rate; a first frame code quantity assignment device for assigning code quantity to an initial frame so that the buffer occupation rate of the initial frame within the image group does not exceed the predetermined upper limit of the buffer occupation rate; and a second frame code quantity assignment device for assigning code quantity to a frame later than the initial frame within the image group, based on the code quantity assigned by said image group code quantity assignment device and first frame code quantity assignment device.

According to the present invention, each code quantity is assigned in every image group so that the buffer occupation rate of an image group having a predetermined number of image frames included in a video signal is within the range of the predetermined upper limit and lower limit of the buffer occupation rate (first stage). Then, each code quantity is assigned to every initial frame so that the buffer occupation rate of the initial frame within each image group does not exceed the predetermined upper limit of the buffer occupation rate (second stage). Each code quantity is assigned to the respective frames later than the initial frame within each image group, based on the assigned code quantity, by the image group code quantity assignment device and the first frame code quantity assignment device (third stage). Accordingly, this assignment of three stages can avoid overflow and underflow in a decoder buffer and optimize code quantity, thereby obtaining an image of high quality. Further, since the coded quantity of the initial frame can be compensated at minimum and the coded quantity of the initial frame can be maintained as it is as much as possible, the present invention can assure a finer image.

In one aspect of the present invention, the first frame code quantity assignment device assigns a code quantity to the initial frame so that the calculated buffer occupation rate of the initial frame is within the range of the predetermined upper limit and lower limit of the buffer occupation rate.

According to this aspect, the present invention can assign the optimum code quantity with no overflow nor underflow by performing compensation of three stages on the coded quantity calculated based on the image complexity index of each frame and each image group forming a video sequence. Further, since the coded quantity of the initial frame can be compensated at minimum and the coded quantity of the initial frame can be maintained as it is as much as possible, the present invention can assure a finer image.

The above object of the present invention can be achieved by a code quantity assignment apparatus of the present invention for encoding a video signal and storing the same into a storage medium in compression encode data storing system. The apparatus is provided with: an image group buffer occupation rate calculation device for calculating target coded quantity of an image group having a predetermined number of image frames included in the video signal, based on image complexity index of each image group, and calculating the buffer occupation rate of each image group; an image group code quantity assignment device for compensating the buffer occupation rate of the image group so that the calculated buffer occupation rate of the image group is within the range of the predetermined upper limit and lower limit of the buffer occupation rate, and assigning code quantity for every image group; a first frame buffer occupation rate calculation device for calculating target coded quantity of the initial frame within the image group to which the code quantity has been assigned, based on the image complexity index of each initial frame, and calculating the buffer occupation rate of each initial frame; a first frame code quantity assignment device for compensating the buffer occupation rate of the initial frame so that the calculated buffer occupation rate of the initial frame does not exceed the predetermined upper limit of the buffer occupation rate, and assigning code quantity to the initial frame; a second frame buffer occupation rate calculation device for calculating target coded quantity of a frame later than the initial frame within the image group to which the code quantity has been assigned, based on the image complexity index of each frame, and calculating the buffer occupation rate of each frame; and a second frame code quantity assignment device for compensating the buffer occupation rate of a frame later than the initial frame so that the calculated buffer occupation rate of the frame later than the initial frame is within the range of the predetermined upper limit and lower limit of the buffer occupation rate, and assigning code quantity to the frame.

According to the present invention, the target coded quantity of an image group having a predetermined number of image frames included in a video signal is calculated on the basis of the image complexity index of each image group and the buffer occupation rate of each image group is calculated. The calculated buffer occupation rate of each image group is compensated so as to be within the rage of the predetermined upper limit and lower limit of the buffer occupation rate, and each code quantity is assigned in every image group (first stage). This time, the target coded quantity of the initial frame within the image group to which the code quantity has been assigned is calculated on the basis of the image complexity index of each initial frame and the buffer occupation rate of each initial frame is calculated. This time, the calculated buffer occupation rate of the initial frame is compensated so as not to exceed the predetermined upper limit of the buffer occupation rate and the code quantity of the initial frame is assigned (second stage). The target coded quantity of the respective frames later than the initial frame within the image group to which the code quantity has been assigned is calculated on the basis of the image complexity index of each frame and the buffer occupation rate of each frame is calculated. The calculated buffer occupation rate of the respective frames later than the initial frame is compensated so as to be within the range of the predetermined upper limit and lower limit of the buffer occupation rate, and the code quantity is assigned to the frame (third stage). The coded quantity calculated on the basis of the image complexity index is compensated in three stages (compensation of the buffer occupation rate in every image group, compensation of the buffer occupation rate of the initial frame, and compensation of the buffer occupation rate of the respective frames later than the initial frame), thereby assigning the optimum code quantity with no overflow nor underflow, to each frame in a decoder buffer, and realizing an image of high quality. Further, in the second stage, the code quantity of the initial frame is to be assigned prior to the third stage, thereby keeping the coded quantity of the initial frame as it is to the utmost and reproducing a finer image.

In one aspect of the present invention, the first frame code quantity assignment device assigns code quantity to the initial frame so that the calculated buffer occupation rate of the initial frame is within the range of the predetermined upper limit and lower limit of the buffer occupation rate.

According to this aspect, the present invention can assign the optimum code quantity with no overflow nor underflow by performing compensation of three stages on the coded quantity calculated based on the image complexity index of each frame and each image group forming a video sequence. Further, since the coded quantity of the initial frame can be compensated at minimum and the coded quantity of the initial frame can be maintained as it is as much as possible, the present invention can assure a finer image.

In another aspect of the present invention, the target coded quantity of the image group is calculated on the basis of the ratio of the total of the image complexity indexes of the respective frames included in the image group and the total of the image complexity indexes of the respective image groups included in the video signal.

According to this aspect, the coded quantity of each image group is in proportion to the image complexity index, thereby preventing unevenness of image quality.

In another aspect of the present invention, the target coded quantity of the initial frame is calculated on the basis of the ratio of the image complexity index of the initial frame and the image complexity index of the image group having the initial frame.

According to this aspect, the coded quantity of the initial frame is in proportion to the image complexity index, thereby preventing unevenness of image quality.

In another aspect of the present invention, the target coded quantity of the frame later than the initial frame is calculated by proportionally distributing a code quantity obtained by subtracting the code quantity of the initial frame assigned by the first frame code quantity assignment device from the code quantity of the image group assigned by the image group code quantity assignment device, based on each image complexity index of the frame later than the initial frame.

According to this aspect, the coded quantity of the respective frames later than the initial frame is in proportion to the image complexity index, thereby preventing unevenness of image quality. The coded quantity of the respective frames later than the initial frame can be proportionally shared, including the code quantity of the initial frame subtracted by the compensation of the second stage.

In another aspect of the present invention, the image group code quantity assignment device judges whether the calculated buffer occupation rate of each image group is larger than the predetermined upper limit of the buffer occupation rate or not and whether it is smaller than the predetermined lower limit of the buffer occupation rate or not, calculates the ratio of the buffer occupation rate of the image group and the predetermined upper limit of the buffer occupation rate as an image group upper limit compensation ratio, as for an image group whose buffer occupation rate is larger than the upper limit, calculates the ratio of the buffer occupation rate of the image group and the predetermined lower limit of the buffer occupation rate as an image group lower limit compensation ratio, as for an image group whose buffer occupation rate is smaller than the lower limit, multiplies the maximum image group upper limit compensation ratio of the calculated image group upper limit compensation ratios, by the buffer occupation rate of the image group larger than the initial buffer occupation rate that is a reference, for compensation, multiplies the maximum image group lower limit compensation ratio of the calculated image group lower limit compensation ratios, by the buffer occupation rate of the image group smaller than the initial buffer occupation that is a reference, for compensation, and assigns code quantity for every image group.

Accordingly, in the buffer occupation rate of each image group, the present invention can avoid overflow and underflow.

In another aspect of the present invention, the first frame code quantity assignment device judges whether the calculated buffer occupation rate of the initial frame is larger than the predetermined upper limit of the buffer occupation rate, compensates the buffer occupation rate of the initial frame so as to be equal to the predetermined upper limit of the buffer occupation rate when the rate is larger than the upper limit, and assigns code quantity to the initial frame.

According to this aspect, in the buffer occupation rate of the initial frame, it can avoid overflow.

In another aspect of the present invention, the first frame code quantity assignment device judges whether the calculated buffer occupation rate of the initial frame is smaller than the predetermined lower limit of the buffer occupation rate, compensates the buffer occupation rate of the initial frame so as to be equal to the predetermined lower limit of the buffer occupation rate when the rate is smaller than the lower limit, and assigns code quantity to the initial frame.

According to this aspect, in the buffer occupation rate of the initial frame, it can avoid underflow.

In another aspect of the present invention, the second frame code quantity assignment device judges whether the calculated buffer occupation rate of the frame later than the initial frame is larger than the predetermined upper limit of the buffer occupation rate and whether it is smaller than the predetermined lower limit of the buffer occupation rate, calculates a first differential between the frame buffer occupation rate larger than the upper limit or the frame buffer occupation rate smaller than the lower limit and the predetermined buffer occupation rate on an ideal line, calculates a second differential between the upper limit or lower limit of the buffer occupation rate and the predetermined buffer occupation rate on an ideal line, calculates the ratio of the first differential and the second differential as a frame compensation ratio, calculates the maximum frame compensation ratio of the calculated frame compensation ratios, respectively as for the upper limit and the lower limit, multiplies the frame compensation ratio by the buffer occupation rate of the frame later than the initial frame, for compensation, and assigns code quantity to the frame.

According to this aspect, in the buffer occupation rate of the initial frame, it can avoid overflow or underflow.

In another aspect of the present invention, the ideal line is a line lying between the buffer occupation rate of the initial frame to which the first frame code quantity assignment device has assigned the code quantity and the buffer occupation rate of the final frame within the image group having the initial frame.

Accordingly, it is possible to calculate the ideal line of each frame buffer occupation rate.

The above object of the present invention can be achieved by a code quantity assignment method of the present invention for encoding a video signal and storing the same into a storage medium in compression encode data storing system. The method is provided with the processes of: assigning code quantity for every image group so that buffer occupation rate of an image group having a predetermined number of image frames included in a video signal is within the range of predetermined upper limit and lower limit of the buffer occupation rate; assigning code quantity to an initial frame so that the buffer occupation rate of the initial frame within the image group does not exceed the predetermined upper limit of the buffer occupation rate; and assigning code quantity to a frame later than the initial frame within the image group, based on the code quantity assigned by said image group code quantity assignment means and first frame code quantity assignment means.

According to the present invention, this assignment of these three stages can avoid overflow and underflow in a decoder buffer, thereby optimizing the code quantity and obtaining an image of high quality.

The above object of the present invention can be achieved by a code quantity assignment method in encoding a video signal and storing the same into a storage medium in compression encode data storing system, the method comprising the processes of: calculating target coded quantity of an image group having a predetermined number of image frames included in the video signal, based on image complexity index of each image group, calculating the buffer occupation rate of each image group, compensating the buffer occupation rate of the image group so that the calculated buffer occupation rate of the image group is within the range of the predetermined upper limit and lower limit of the buffer occupation rate, assigning code quantity for every image group, calculating target coded quantity of the initial frame within the image group to which the code quantity has been assigned, based on the image complexity index of each initial frame, calculating the buffer occupation rate of each initial frame, compensating the buffer occupation rate of the initial frame so that the calculated buffer occupation rate of the initial frame does not exceed the predetermined upper limit of the buffer occupation rate, assigning code quantity to the initial frame, calculating target coded quantity of a frame later than the initial frame within the image group to which the code quantity has been assigned, based on the image complexity index of each frame, calculating the buffer occupation rate of each frame, compensating the buffer occupation rate of a frame later than the initial frame so that the calculated buffer occupation rate of the frame later than the initial frame is within the range of the predetermined upper limit and lower limit of the buffer occupation rate, and assigning code quantity to the frame.

According to the present invention, the coded quantity calculated on the basis of the image complexity index is compensated in three stages (compensation of the buffer occupation rate in every image group, compensation of the buffer occupation rate of the initial frame, and compensation of the buffer occupation rate of the respective frames later than the initial frame), thereby assigning the optimum code quantity with no overflow nor underflow, to each frame in a decoder buffer, and realizing an image of high quality. Further, in the second stage, the code amount of the initial frame is assigned prior to the third stage, thereby keeping the coded quantity of the initial frame as it is to the utmost and reproducing a finer image.

In one aspect of the present invention, the target coded quantity of the image group is calculated on the basis of the ratio of the total of the image complexity indexes of the respective frames included in the image group and the total of the image complexity indexes of the respective image groups included in the video signal.

According to this aspect, the coded quantity of each image group is in proportion to the image complexity index, thereby preventing unevenness of image quality.

In another aspect of the present invention, the target coded quantity of the initial frame is calculated on the basis of the ratio of the image complexity index of the initial frame and the image complexity index of the image group having the initial frame.

According to this aspect, the coded quantity of the initial frame is in proportion to the image complexity index, thereby preventing unevenness of image quality.

In another aspect of the present invention, the target coded quantity of the frame later than the initial frame is calculated by proportionally distributing code quantity obtained by subtracting the code quantity of the initial frame assigned by the process of compensating the buffer occupation rate of the initial frame from the code quantity of the image group assigned by the process of compensating the buffer occupation rate of the image group, based on each image complexity index of the frame later than the initial frame.

According to this aspect, the coded quantity of the initial frame is in proportion to the image complexity index, thereby preventing unevenness of image quality.

BRIEF DESCRIPTION OF THE DRAWINGS

FIG. 10 is a flow chart showing the compensation processing of the coded quantity for every frame by the code assignment calculating unit in accordance with the embodiment of the present invention;

FIGS. 11A to 11C are graphs showing the buffer occupation rate (%) in the compensation of the coded quantity for every frame;

FIG. 15 is a diagram showing the relationship when an image complexity index and a target coded quantity are represented by every frame, every GOP and by the total GOP.

DESCRIPTION OF THE PREFERRED EMBODIMENT

Hereinafter, a preferred embodiment of the present invention will be described with reference to the drawings.

The the embodiment described later is in the case of adopting the present invention to the assignment of an optimum code quantity to each frame, in a code quantity assignment device (hereinafter, referred to as "MPEG encoder") for encoding a video signal by the MPEG method and storing it into a storage medium in compression encode data storing. The storage medium includes a DVD-ROM, a DVD-RAM, a DVD-RW, CD-ROM, and a hard disk.

Figure 1:
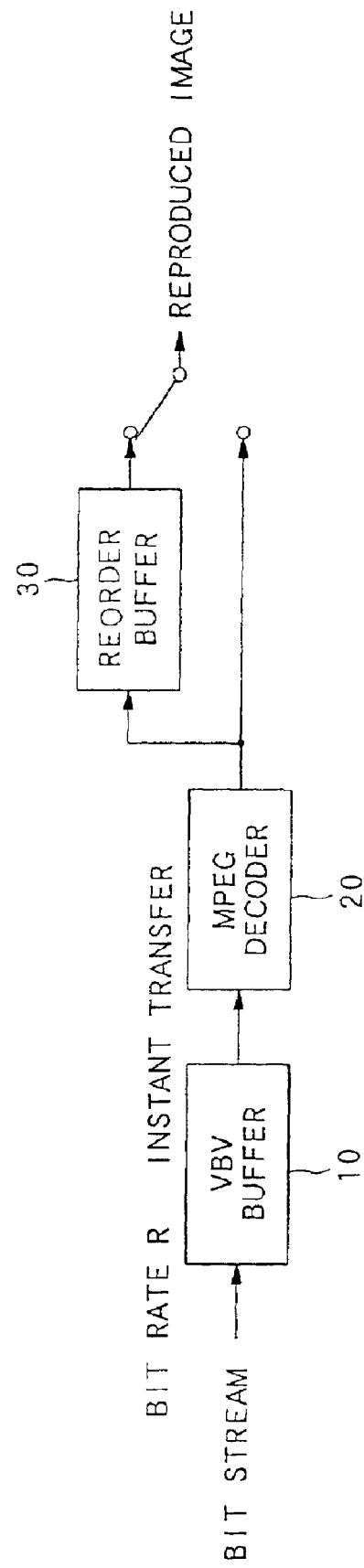
FIG. 1 is a diagram showing an ideal (virtual) model of an MPEG decoder in accordance with an embodiment of the present invention.
Figure 2:
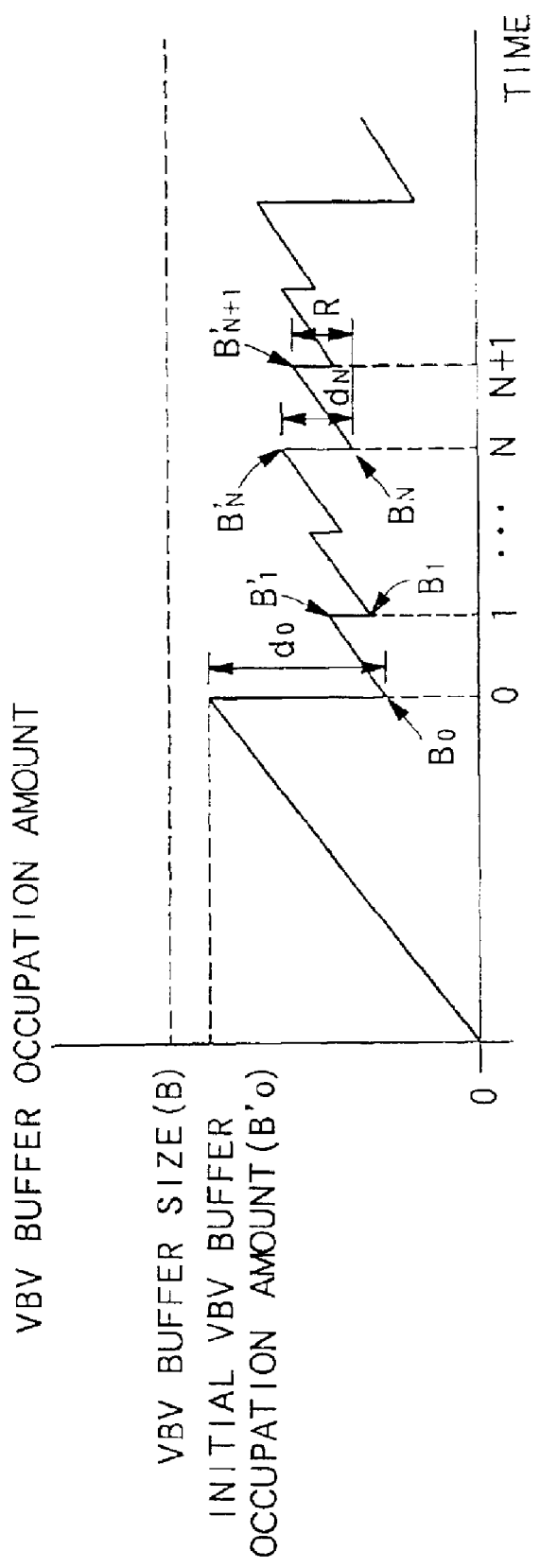
FIG. 2 is a graph showing a transition of a data occupation amount (bits) of a VBV buffer in accordance with the embodiment of the present invention.

Before describing the embodiment more specifically, such a flow that a decoder (hereinafter, referred to as "MPEG decoder") for decoding by the MPEG method decodes a video sequence created by the MPEG encoder and stored in a storage medium (hereinafter, referred to as "bit stream (encoded data string)") will be described with reference to FIGS. 1 and 2. FIG. 1 is a diagram showing an ideal (virtual) model of the MPEG decoder (STD: System Target Decoder). This ideal model comprises a VBV (Video Buffer Verifier) buffer 10, an MPEG decoder 20, and a reorder buffer 30. FIG. 2 is a graph showing a transition of the data occupation rate (%) of the VBV buffer 10. For the sake of brief description of the flow, although a fixed bit rate and a fixed frame rate are used here, it is the same if variable ones are used.

As illustrated in FIG. 1, the bit stream created by the MPEG encoder is supplied to the VBV buffer 10 at bit rate R and stored therein. Thus, the data occupation amount (bits) of the VBV buffer 10 is gradually increased as illustrated by the reference numeral 50 in FIG. 2. The bit rate R means the data amount (bits) to be supplied to the VBV buffer 10 between frames and it shows the bit rate R=bit rate/frame rate. The bit stream is formed by various header information such as VHS (Video Sequence Header) and GOP (Group Of Picture) that is an image group having a predetermined number of image frames. The GOP consists of one and more pictures, and one picture shows one frame. This picture classifies into three kinds: I picture (Intra-Picture) formed by only a code within frame (without predictive coding), P picture (Predictive-Picture) formed by a predictive code between frames only in the forward direction (forward interpolated predictive coding), and B picture (Bidirectionally predictive-Picture) formed by a predictive code between frames bidirectionally (bidirectional interpolated predictive coding). Generally, in the frame structure of the GOP, there is the I picture at first, then followed by the P picture and the B picture. The average coded quantity of each picture is like this: I picture>P picture>B picture. A picture is formed by a plurality of slices divided by any region. A slice is formed by a plurality of macro blocks reordered in the order of left to right or in the order of up to down.

When the bit stream supplied to the VBV buffer 10 reaches the data amount for an initial buffer occupation amount ($B'_o$) shown in FIG. 2, specified within the bit stream, the data for one frame is transferred to the MPEG decoder 20 from the VBV buffer 10 instantly. Thus, as shown in FIG. 2, the data occupation amount (bits) of the VBV buffer 10 is decreased by a transferred code quantity ($d_o$). Continuously, the bit streams are being stored in the VBV buffer 10. As for the next frame data, when it becomes the time to decode the next frame, the data is instantly transferred from the VBV buffer 10 to the MPEG decoder 20. Thereafter, the bit stream supplied to the VBV buffer 10 is transferred every time it reaches the time to decode each frame. The symbol "B" shown in FIG. 2 indicates a VBV buffer size (bits), the "B'$_N$" indicates a VBV buffer occupation amount (bits) before removing (transferring) the data of the Nth frame, the "B$_N$" indicates a VBV buffer occupation amount (bits) after removing the data of the Nth frame, and the "d$_N$" indicates a code quantity (bits) of the Nth frame. In the example of FIG. 2, since the first frame is the I picture, the buffer occupation amount (B'$_o$) is greater than the buffer occupation amount (for example, B'$_N$) of the frame thereafter.

The data of one frame transferred to the MPEG decoder 20 is instantly decoded and supplied as image data. At this time, when it is necessary to change the order of some frame, for example, when the relevant frame is of the B picture, the order of the frame is changed and supplied in a reorder buffer 30.

Figure 3:
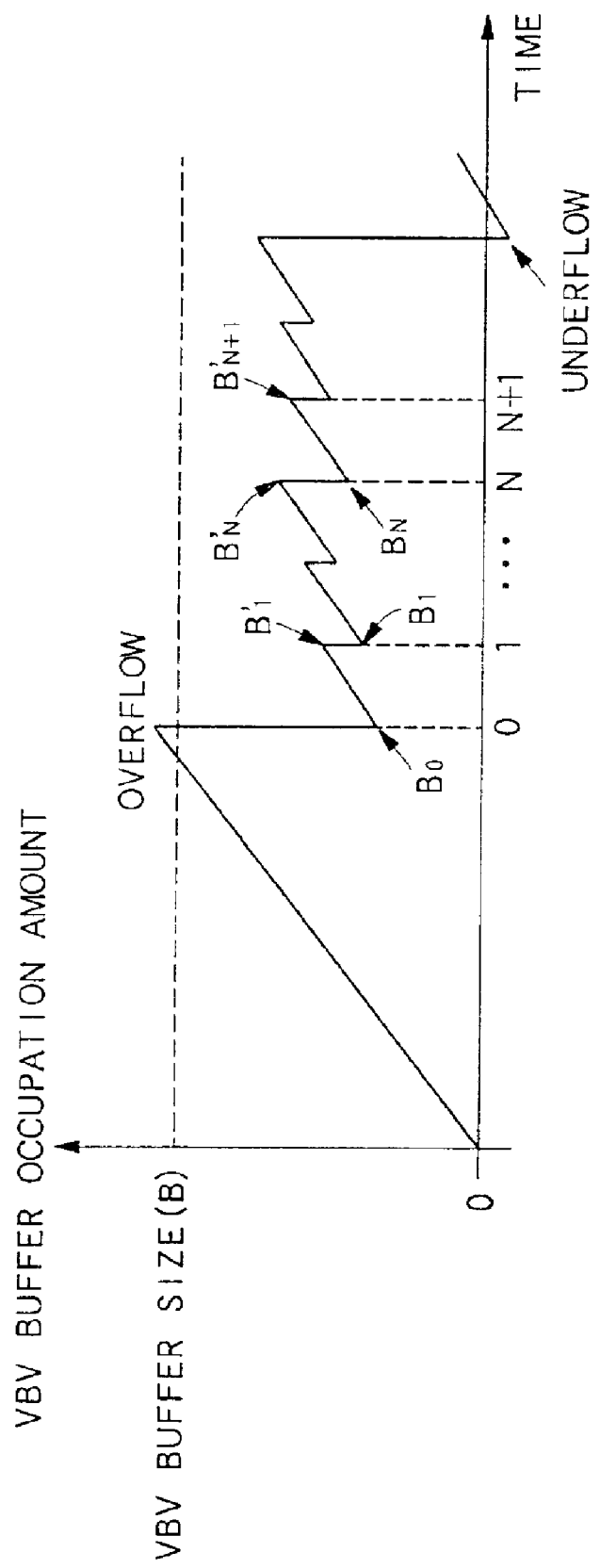
FIG. 3 is a graph showing a transition of a data occupation amount (bits) of the VBV buffer when there is overflow and underflow in FIG. 2.

Thus, though the supplied bit stream is decoded by the MPEG decoder 20, the MPEG encoder must guarantee the condition B$_N$≧0 and B'$_N$≦B so as to prevent from overflow and underflow in the VBV buffer 10 as shown in FIG. 3. Namely, the MPEG encoder has to assign the optimum code quantity to each frame to create a bit stream so as to satisfy the above condition.

The embodiment of the present invention as for assignment of the optimum code quantity to each frame in the MPEG encoder will be described with reference to FIGS. 4 to 14 more specifically.

Figure 4:
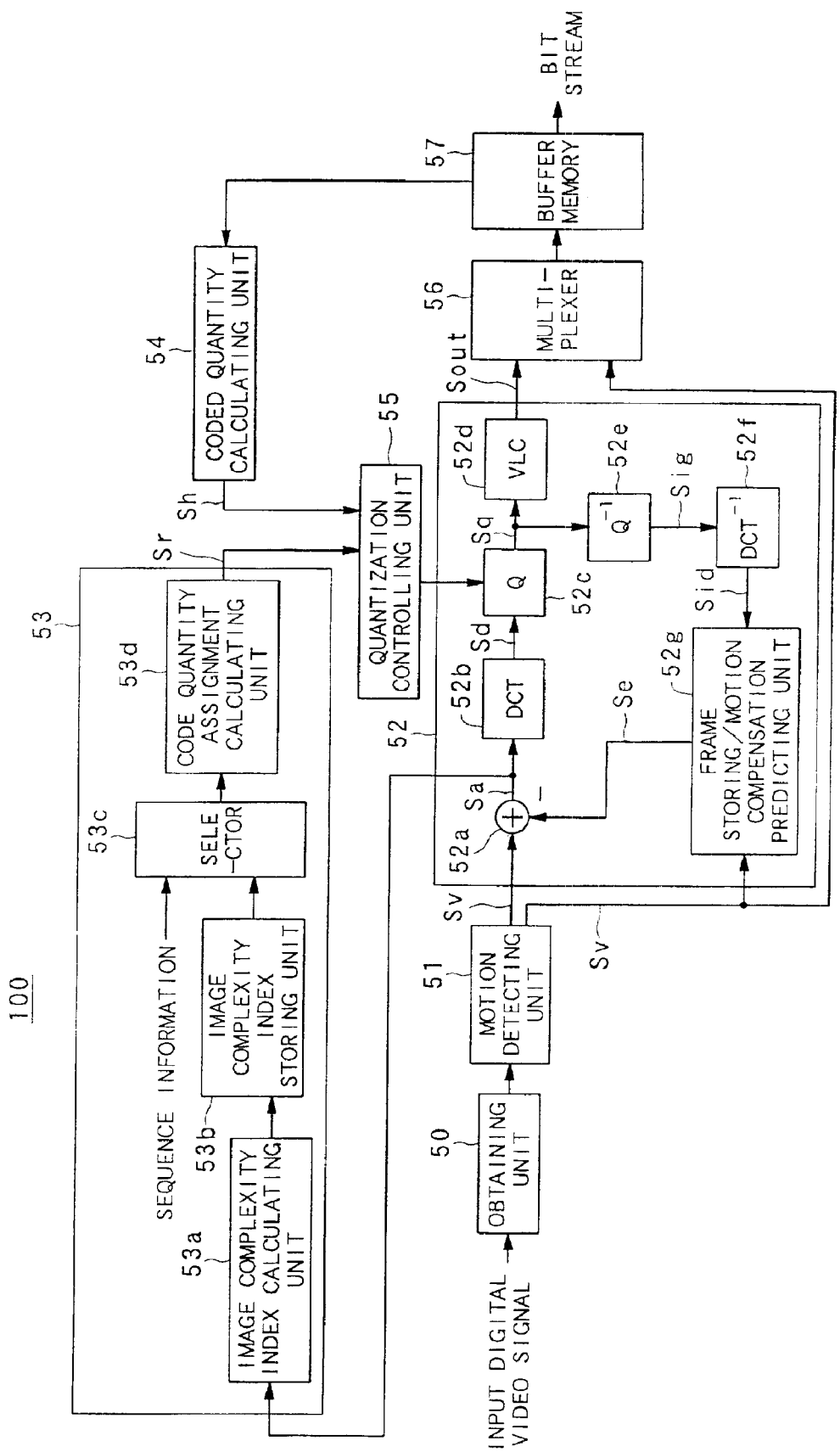
FIG. 4 is a schematic diagram showing a structure of an MPEG encoder 100 in accordance with the embodiment of the present invention.

FIG. 4 is a schematic diagram showing a structure of the MPEG encoder 100 in accordance with the embodiment of the present invention. As illustrated in FIG. 1, the MPEG encoder 100 comprises an obtaining unit 50, a motion detecting unit 51, a coding unit 52, an optimum code quantity calculating unit 53, a coded quantity calculating unit 54, a quantization controlling unit 55, a multiplexer 56, and a buffer memory 57.

At first, the operation of the MPEG encoder 100 will be described simply.

The obtaining unit 50 obtains image data for every one frame from an input digital video signal and then performs predetermined processing such as thinning out fields. The unit 50 checks the type of the picture of the obtained frame, and when it is necessary to change the order of some frame, for example, when the relevant frame is of the B picture, it changes the order of the frame. The motion detecting unit 51 calculates the motion vector of the input image by the macro block of 16×16 pixels and supplies it as a frame signal Sv.

The coding unit 52 includes an adding unit 52a, a discrete cosine transform (DCT) unit 52b, a quantization (Q) unit 52c, a variable length coding (VLC) unit 52d, an inverse quantization (Q$^{-1}$) unit 52e, an inverse discrete cosine transform (DCT$^{-1}$) unit 52f, and a frame storing/motion compensation predicting unit 52g.

The adding unit 52a subtracts a compensation signal Se supplied from the motion compensation predicting unit 52g, from the frame signal Sv supplied from the motion detecting unit 51 and supplies the result to the discrete cosine transform unit 52b as a subtraction signal Sa. The discrete cosine transform unit 52b transforms the subtraction signal Sa by using the two-dimensional discrete cosine in every block of 8×8 pixels and supplies it to the quantization unit 52c as a transform signal Sd. The quantization unit 52c quantizes the transform signal Sd by the quantization scale decided based on a rate signal Sr from the quantization controlling unit 55 described later, and supplies it to the variable length coding unit 52d and the inverse quantization unit 52e as a quantization signal Sq.

The inverse quantization unit 52e performs the inverse quantization processing on the quantization signal Sq and supplies it to the inverse discrete cosine transform (DCT$^{-1}$) unit 52f as an inverse quantization signal Sig. The inverse discrete cosine transform unit 52f transforms the inverse quantization signal Sig by the inverse discrete cosine and supplies it to the motion compensation predicting unit 52g as an inverse transform signal Sid. The motion compensation predicting unit 52g performs the motion compensation processing using, what is called, the interpolated prediction in the MPEG method, based on the inverse transform signal Sid and the motion vector included in the frame signal Sv supplied from the motion detecting unit 51, so to create the above compensation signal Se and supply it to the adding unit 52a.

While, the variable length coding unit 52d performs the variable length coding processing on the above quantization signal Sq and supplies it to the buffer memory 57 through the multiplexer 56 as a variable length code Sout. The variable length code Sout is supplied from the buffer memory 57 as a bit stream and stored in the storage medium in these ways. At this time, the coded quantity calculating unit 54 calculates the actual coded quantity based on the variable length code Sout of the buffer memory 57 and when it exceeds the target value, it supplies a compensation signal Sh to the quantization controlling unit 55. Thus, the quantization controlling unit 55 decides the quantization scale based on the compensation signal Sh and the rate signal Sr.

The assigning processing of the optimum coded quantity to each frame of the present invention, will be described. The processing is performed in the optimum coded quantity calculating unit 53. The optimum coded quantity calculating unit 53 includes an image complexity index calculating unit 53a, an image complexity index storing unit 53b, a selector 53c, and a coded quantity assignment calculating unit 53d.

Figure 5:
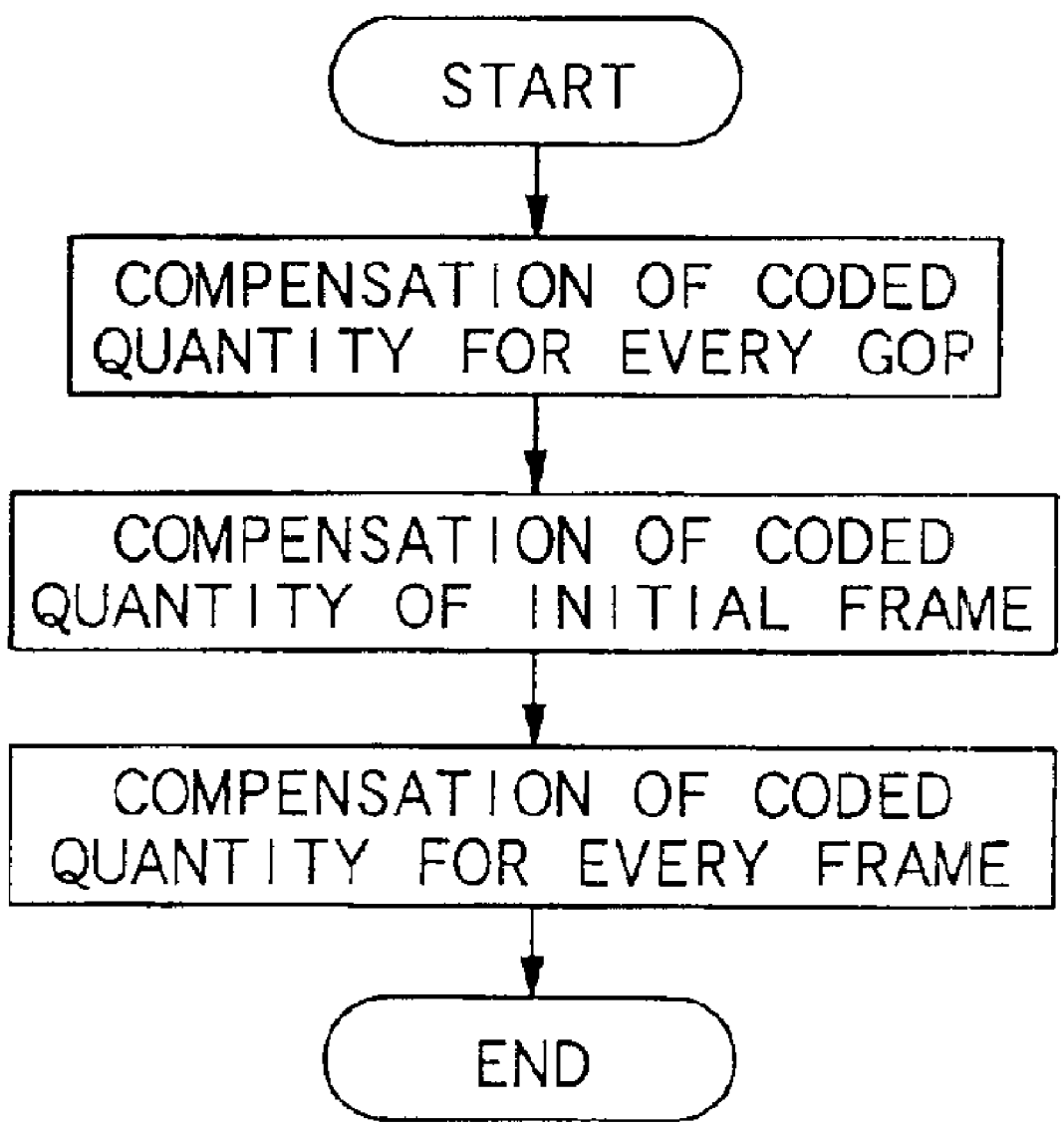
FIG. 5 is a flow chart showing a compensation processing of a coded quantity in accordance with the embodiment of the present invention.

The image complexity index calculating unit 53a calculates the image complexity index of each frame, based on the subtraction signal Sa supplied from the adding unit 52a of the coding unit 52. The image complexity index is represented by dispersion, or average absolute error, and it is in proportion to (or it is some function, for example, an index function of) the coded quantity of each frame. For example, as the image complexity index, the I picture uses the dispersion, the P picture and the B picture use the dispersion of a differential image. The image complexity index storing unit 53b stores the image complexity index calculated by the image complexity index calculating unit 53a. After calculating the image complexity index of all frames, the data of the image complexity index is supplied from the image complexity index storing unit 53b to the code assignment calculating unit 53d through the selector 53c. Since the image complexity index of each frame within the first GOP cannot be calculated by the image complexity index calculating unit 53a, the image complexity index having been previously set at some rate is taken from the selector 53c as the sequence information and supplied to the code assignment calculating unit 53d. The code assignment calculating unit 53d calculates in order to assign the optimum code quantity to each frame based on the image complexity index of each frame. This calculation can be roughly divided into three stages as shown in FIG. 5. In the first stage, coded quantity is compensated in every GOP, in the second stage, coded quantity of the first frame is compensated, and in the third stage, coded quantity is compensated in every frame.

(1) Compensation of Coded Quantity in Every GOP

Figure 6:
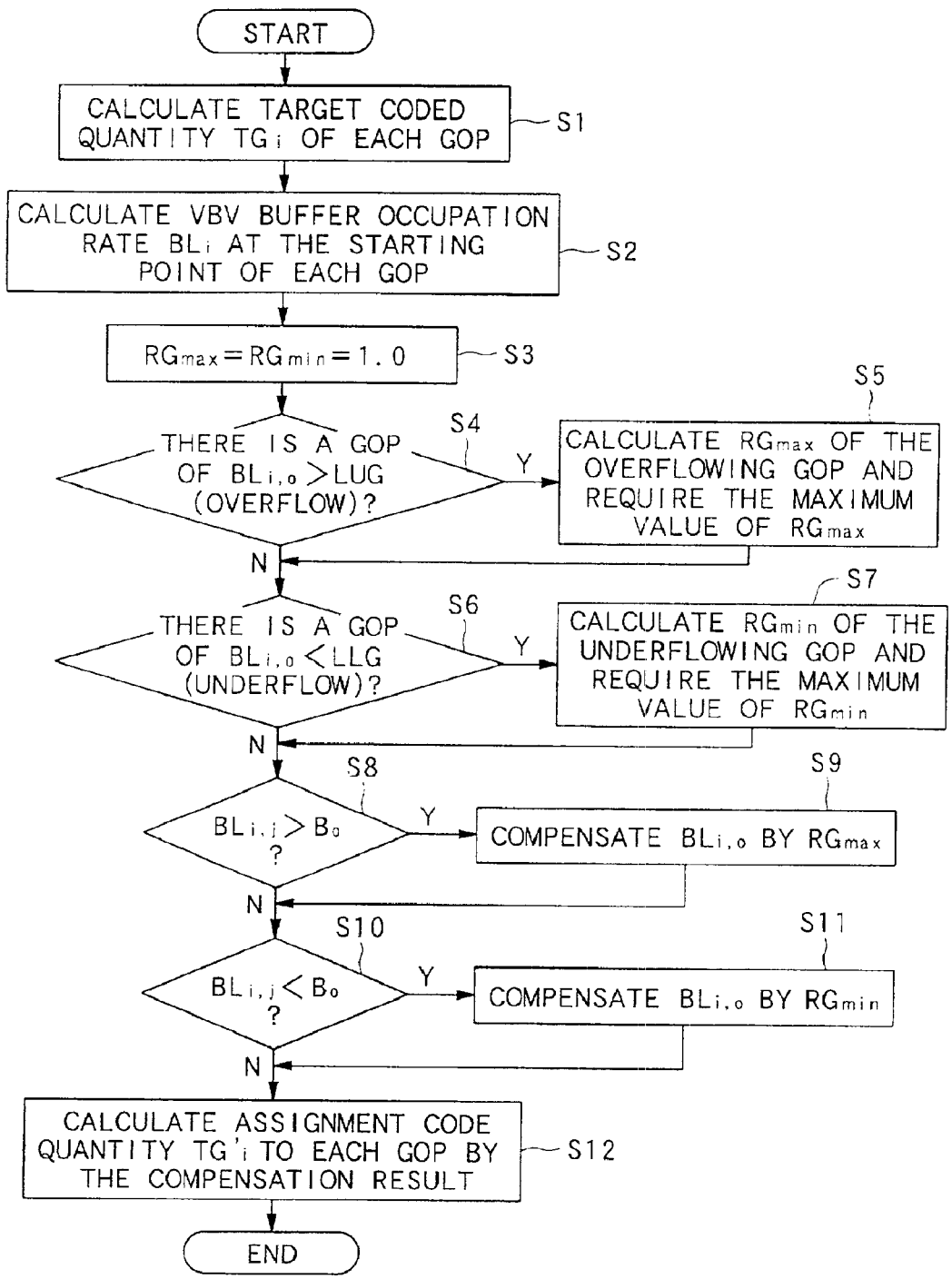
FIG. 6 is a flow chart showing a compensation processing of a coded quantity in every GOP by the code assignment calculating unit in accordance with the embodiment of the present invention.
Figure 7:
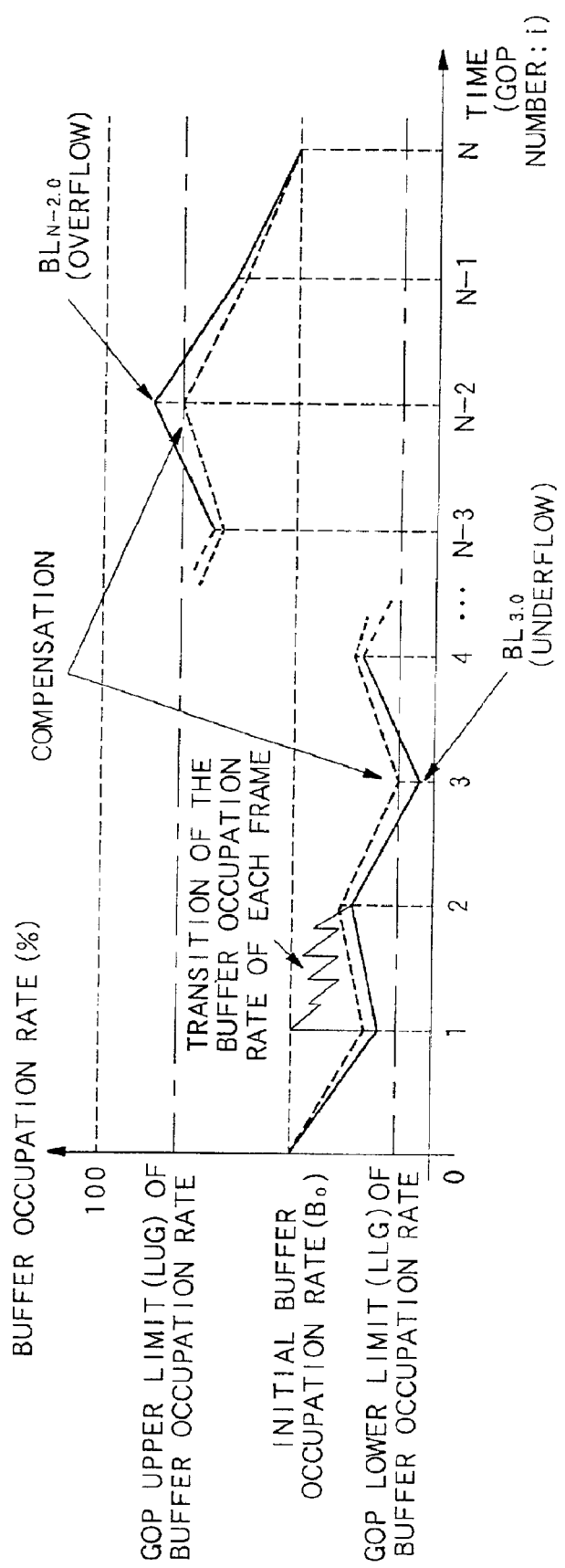
FIG. 7 is a graph showing a buffer occupation rate (%) in the compensation of a coded quantity in every GOP.

Hereinafter, the compensation of the coded quantity in every GOP of the first stage will be described with reference to FIG. 6 and FIG. 7. FIG. 6 is a flow chart showing the compensation processing of the coded quantity in every GOP by the code assignment calculating unit 53d, and FIG. 7 is a graph showing the buffer occupation rate (%) in the compensation of the code quantity in every GOP.

The target coded quantity (bits) in each GOP is calculated based on the image complexity index of each frame (S1). For example, when the target total coded quantity (target bit rate (bps)×second (s)) is defined as T, the total image complexity index is defined as S, and the image complexity index of the ith GOP is defined as $SG_i$, the target coded quantity ($TG_i$) of the ith GOP can be calculated by the following formula (expression 1).

$$TG_i = T \cdot SG_i / S \qquad \text{(expression 1)}$$

FIG. 15 shows the correlation as for the target coded quantity and the image complexity index frequently used in the following description, by the unit of frame, the unit of GOP, and the total GOP.

The VBV buffer occupation rate (%) (before occurrence of frame data) at a starting point of each GOP is calculated based on the obtained target coded quantity (bits) of each GOP (S2). For example, when the VBV buffer size (bits) is defined as B, the number of frames of the ith GOP is defined as $NG_i$, and the decrease amount of the buffer (bits) in every frame is defined as R, the VBV buffer occupation rate ($BL_{i+1,0}$) at a starting point of the (i+1)th GOP can be calculated by the following formula (expression 2).

$$BL_{i+1,0} = BL_{i,0} + (TG_i - R \cdot NG_i)/B \qquad \text{(expression 2)}$$

The VBV buffer occupation rate ($BL_{1,0}$) at a starting point of the first GOP coincides with the initial buffer occupation rate ($B_0$). Namely, $BL_{i,0} = B_0$.

When the VBV buffer occupation rate (%) at a starting point of every GOP has been calculated, the GOP compensation rate ($RG_{max}$) at an overflow side described later is set at "1" and the GOP compensation rate ($RG_{min}$) at an underflow side is set at "1" (S3). The $RG_{max}$ and $RG_{min}$ are parameters for use in compensating the coded quantity in every GOP and they are respectively set at "1" (namely, indicating no compensation) in the initial stage.

It is judged whether there is any GOP or not in which the VBV buffer occupation rate (%) at a starting time of GOP is larger than the predetermined GOP upper limit (LUG) of the VBV buffer occupation rate (%) (namely, the presence of an overflowing GOP) (S4). For example, when the VBV buffer occupation rate ($BL_{N-2,0}$) at a starting point of the (N-2)th GOP exceeds the GOP upper limit (LUG) of the VBV buffer occupation rate (%) as illustrated in FIG. 7, it is judged that the relevant GOP is overflowing. As for all of the GOP judged to be overflowing, the GOP compensation rate ($RG_{max}$) (only $BL_{N-2,0}$ in FIG. 7, however, actually a plurality of the same rates exist) is calculated and the maximum GOP compensation rate ($RG_{max}$), of them, is set as the new GOP compensation rate ($RG_{max}$) (S5). When the initial buffer occupation rate (%) is defined as $B_0$, the maximum GOP compensation rate ($RG_{max}$) can be calculated by the following formula (expression 3).

$$RG_{max} = \max((BL_{i,0} - B_0)/(LUG - B_0)) \qquad \text{(expression 3)}$$

It is judged whether there is any GOP or not in which the VBV buffer occupation rate (%) at a starting time of the GOP is smaller than the predetermined GOP lower limit (LLG) of the VBV buffer occupation rate (%) (namely, the presence of an underflowing GOP) (S6). For example, when the VBV buffer occupation rate ($BL_{3,0}$) at a starting point of the third GOP is smaller than the GOP lower limit (LLG) of the VBV buffer occupation rate (%), it is judged that the relevant GOP is underflowing. The GOP compensation rate ($RG_{min}$) is calculated as for all of the GOP judged to be underflowing, and the maximum GOP compensation rate ($RG_{min}$), of them, is set as the new GOP compensation rate ($RG_{min}$) (S7). The maximum GOP compensation rate ($RG_{min}$) can be calculated by the following formula (expression 4).

$$RG_{min} = \max((BL_{i,0} - B_0)/(LLG - B_0)) \qquad \text{(expression 4)}$$

The GOP upper limit (LUG) and the GOP lower limit (LLG) can be set at any value considering the deviation from the actual coded quantity and itself.

It is judged whether the VBV buffer occupation rate (%) at a starting point of each GOP is larger than the initial buffer occupation rate ($B_0$) or not (S8). As for the GOP judged to be larger than the initial buffer occupation rate ($B_0$), the VBV buffer occupation rate (%) at a starting point of the relevant GOP is compensated based on the compensation rate ($RG_{max}$) calculated in Step S5 (S9). Namely, as illustrated in FIG. 7, the buffer occupation rates (%) of all the frames within the corresponding GOP are to be uniformly decreased based on the compensation rate ($RG_{max}$) (to be compensated from the buffer occupation rate (%) of a solid line to the buffer occupation rate (%) of a dotted line, in the example of FIG. 7). For example, the ith VBV buffer occupation rate ($BL'_{i,o}$) which has been compensated in Step S9 is calculated by the following formula (expression 5).

$$BL'_{i,o} = B_o + (BL_{i,o} - B_o)/RG_{max} \qquad \text{(expression 5)}$$

This time, it is judged whether the VBV buffer occupation rate (%) at the starting point of each GOP is smaller than the initial buffer occupation rate ($B_o$) or not (S10). With respect to some GOP in which the VBV buffer occupation rate is smaller than the initial buffer occupation rate ($B_o$), the VBV buffer occupation rate (%) at the starting point of the same GOP is compensated based on the compensation rate ($RG_{min}$) calculated in Step S7 (S11). In this compensation, the buffer occupation rates (%) of all the frames within the corresponding GOP are uniformly increased based on the compensation rate ($RG_{min}$). For example, the ith VBV buffer occupation rate ($BL'_{i,o}$) after having been compensated in Step S11 can be calculated by the following formula (expression 6).

$$BL'_{i,o} = B_o + (BL_{i,o} - B_o)/RG_{min} \qquad \text{(expression 6)}$$

The VBV buffer occupation rate (%) at the starting point of each GOP has been compensated thus, and based on each compensation result, assignment code quantity of each GOP is calculated (S12). For example, when the number of the frames of the ith GOP is defined as $NG_i$ and the decreasing amount (bits) of the VBV buffer of each frame is defined as R, the assignment code quantity ($TG'_i$) of the ith GOP can be calculated by the following formula (expression 7).

$$TG'_i = R \cdot NG_i + (BL_{i+1,o} - BL_{i,o}) \cdot B \qquad \text{(expression 7)}$$

Here, if having been compensated in Step S7 or Step S9, the compensated $BL'_{i+1,o}$, $BL'_{i,o}$ is used for $BL_{i+1,o}$, $BL_{i,o}$, and if not having been compensated, the $BL_{i+1,o}$, $BL_{i,o}$ calculated in Step S3 is used.

Thus, the coded quantity is compensated in every GOP in the first stage and the code quantity is assigned to each GOP. At first, in every GOP, overflow and underflow can be restrained as much as possible.

When the sequence to be encoded has no GOP structure and the sequence is short, the whole is regarded as one GOP and the above processing is skipped. When the sequence to be encoded has no GOP structure and the sequence is long, the whole is divided into a plurality of sequences, the respective ones are regarded as GOP, and the above processing is performed.

(2) Compensation of the Coded Quantity of the Initial Frame

In the above first compensation stage, the VBV buffer occupation rate (%) of every frame within the GOP is not considered but the VBV buffer occupation rate (%) in every GOP is considered, so to decide the assignment code quantity. Therefore, the buffer occupation rate (%) of the frame within the GOP becomes greater than the predetermined frame upper limit (LUF) of the VBV buffer occupation rate (%) in some cases, and it becomes smaller than the frame lower limit (LLF) of the VBV buffer occupation rate (%) in other cases. In such cases, the coded quantity of the initial frame is to be compensated and the optimum code amount is to be assigned to the initial frame in the second stage. The coded quantity of the respective frames later than the initial frame is to be compensated in the third stage.

Figure 8:
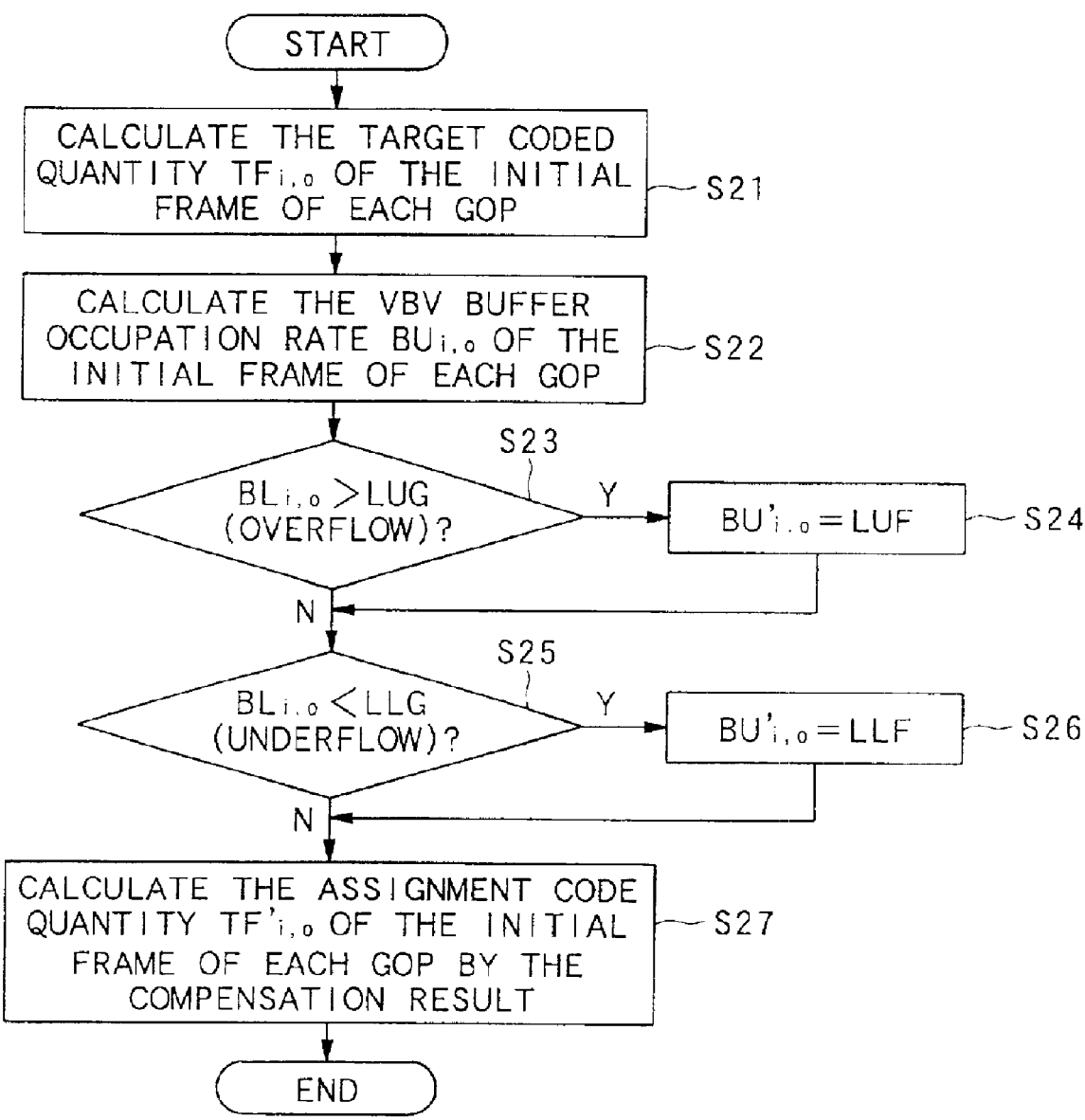
FIG. 8 is a flow chart showing a compensation processing of the coded quantity of the initial frame by a code assignment calculating unit in accordance with the embodiment of the present invention.
Figure 9A:
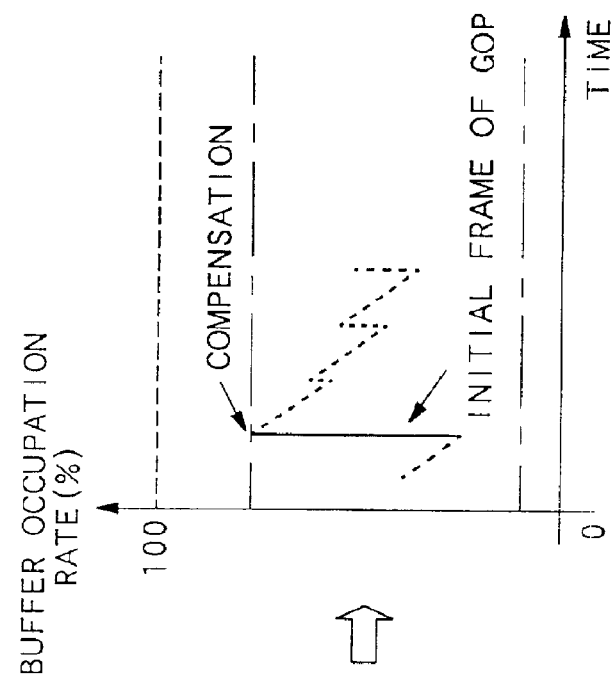
FIGS. 9A and 9B are graphs showing the buffer occupation rate (%) in the compensation of the coded quantity of the initial frame.
Figure 9B:
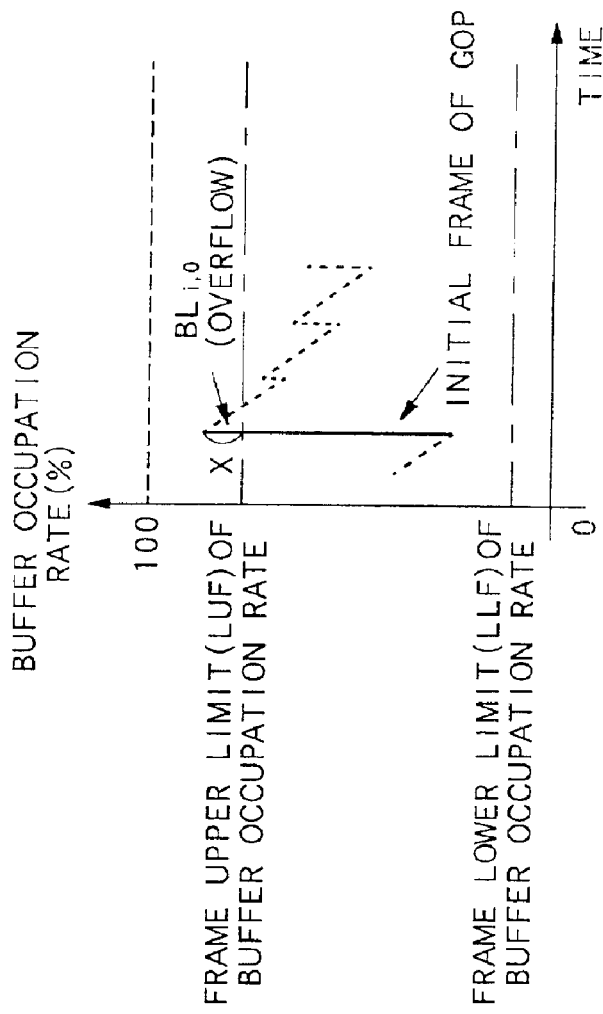

Hereinafter, the compensation of the coded quantity of the initial frame in the second stage will be described with reference to FIG. 8 and FIG. 9. FIG. 8 is a flow chart showing the compensation processing of the coded quantity of the initial frame by the code assignment calculating unit 53d, and FIGS. 9A and 9B are graphs showing the buffer occupation rate (%) in the compensation of the coded quantity of the initial frame.

At first, the target coded quantity (bits) of the initial frame of the GOP is calculated according to the rate of the image complexity index of the initial frame and the image complexity index of the GOP, and the target coded quantity (bits) of the GOP (S21). For example, when the image complexity index of the initial frame of the ith GOP is defined as $SF_{i,o}$ and the image complexity index of the ith GOP is defined as $SG_i$, the target coded quantity (bits) of the initial frame of the ith GOP ($TF_{i,o}$) can be calculated by the following formula (expression 8).

$$TF_{i,o} = TG_i \cdot SF_{i,o}/SG_i \quad \text{(expression 8)}$$

Next, based on the VBV buffer occupation rate (%) at the starting point of the required GOP, the VBV buffer occupation rate (%) of the initial frame (for example, the VBV buffer occupation rate $BU_{i,o}$ of the initial frame of the ith GOP) can be calculated by the following formula (expression 9) (S22).

$$BU_{i,o} = BL_{i,o} + TF_{i,o}/B \quad \text{(expression 9)}$$

It is judged whether the VBV buffer occupation rate (%) of the initial frame is larger than the predetermined frame upper limit (LUF) of the VBV buffer occupation rate (%) or not (whether it overflows or not) (S23). When it is judged to be larger than the frame upper limit (LUF), the VBV buffer occupation rate (%) of the initial frame is compensated (S24). For example, the compensated buffer occupation rate ($BU'_{i,o}$) of the initial frame of the ith GOP can be calculated by the following formula (expression 10).

$$BU'_{i,o} = LUF \quad \text{(expression 10)}$$

The example of FIG. 9 shows that the excess amount (X) beyond the frame upper limit (LUF) is subtracted from the VBV buffer occupation rate ($BU_{i,o}$) of the initial frame, which is set as new VBV buffer occupation rate ($BU'_{i,o}$). This subtracted coded quantity of "X", namely the code quantity to be assigned to the initial frame primarily is to be allotted (proportional distribution) to the later frame (the frame later than the initial frame within the same GOP) in the third compensation stage described later.

It is judged whether the VBV buffer occupation rate (%) of the initial frame of the GOP is smaller than the predetermined frame lower limit (LLF) of the VBV buffer occupation rate (%) or not (whether it underflows or not) (S25). When it is judged to be smaller than the frame lower limit (LLF), the VBV buffer occupation rate (%) of the initial frame is compensated (S26). For example, the compensated buffer occupation rate ($BU'_{i,o}$) of the initial frame of the ith GOP can be calculated by the following formula (expression 11).

$$BU'_{i,o} = LLF \quad \text{(expression 11)}$$

The frame upper limit (LUF) and the frame lower limit (LLF) can be set at any value taking the deviation from the actual coded quantity into consideration.

Thus, the VBV buffer occupation rate (%) of the initial frame of the GOP has been compensated and the assignment code quantity of the initial frame of the GOP based on the compensation result is calculated (S27). For example, the assignment code quantity ($TF'_{i,o}$) of the initial frame of the ith GOP can be calculated by the following formula (expression 12).

$$TF'_{i,o} = (BU_{i,o} - BL_{i,o}) \cdot B \quad \text{(expression 12)}$$

The compensated $BU'_{i,o}$ is used for $BU_{i,o}$ if having been compensated in Step S24 or Step S26, and the $BU_{i,o}$ calculated in Step S22 is used if not having been compensated.

The coded quantity of the initial frame is to be compensated in all the GOPs within the sequence to be encoded.

Thus, in the second stage, the coded quantity of the initial frame within the GOP is compensated and the optimum code quantity is assigned to the initial frame. Since the code quantity of the initial frame is thus decided, the coded quantity of the respective frames later than the initial frame can be compensated in the third stage with this as a reference. Why the coded quantity of the initial frame is to be compensated at first is that the GOP has the structure of the I picture at first, then the P picture and the B picture, and that the P picture and the B picture are to be predicted by reference to the frame of the I picture. In order to obtain a fine image, it is necessary to maintain the coded quantity of the I picture that is the initial frame, as it is to the utmost. Namely, in the second stage, when the VBV buffer occupation rate of the initial frame does not overflow, the coded quantity of the I picture that is the initial frame is maintained as it is, and it is not compensated in the third stage thereafter. In the second stage, when the VBV buffer occupation rate of the initial frame overflows, the coded quantity of the I picture that is the initial frame is compensated at the minimum and it is not compensated in the third stage thereafter. Therefore, a fine image can be obtained.

(3) Compensation of the Coded Quantity for Every Frame

Although the coded quantity of the initial frame of the GOP has been compensated and the optimum code quantity has been assigned in the second compensation stage, the third compensation stage is to compensate the coded quantity of the respective frames later than the initial frame and assign the optimum code quantity.

The compensation of the coded quantity for every frame in the third stage will be described with reference to FIG. 10 and FIG. 11. FIG. 10 is a flow chart showing the compensation processing of the coded quantity for every frame by the code assignment calculating unit 53d, and FIGS. 11A to 11C are graphs showing the buffer occupation rate (%) in the compensation of the coded quantity for every frame.

At first, the target coded quantity (bits) of each frame later than the initial frame within the GOP is calculated based on the image complexity index of each frame (S31). The code quantity of the initial frame is subtracted from the code quantity assigned to the GOP, and this remain is proportionally distributed by the image complexity index, thereby calculating the target coded quantity (bits) of each frame. For example, when $t=TG_i-TF_{i,o}$ and $s=SG_i-SF_{i,o}$, the target coded quantity (bits) of the jth frame of the ith GOP ($TF_{i,j}$) can be calculated by the following formula (expression 13).

$$TF_{i,j}=t\cdot SF_{i,j}/s \qquad \text{(expression 13)}$$

Based on the calculated target coded quantity (bits) of the frame of the GOP, the VBV buffer occupation rate (%) before and after occurrence of the frame data is calculated (S32). For example, when the VBV buffer size (bits) is defined as B, the VBV buffer occupation rate ($BU_{i,j}$) after the data occurrence of the jth frame of the ith GOP can be calculated by the following formula (expression 14).

$$BU_{i,j}=BL_{i,j}+TF_{i,j}/B \qquad \text{(expression 14)}$$

Where, "$BL_{i,j}$" of the formula (expression 13) shows the VBV buffer occupation rate (%) before the data occurrence of the jth frame of the ith GOP, which can be calculated by, for example, the following formula (expression 15).

$$BL_{i,j+1}=BU_{i,j}-R/B \qquad \text{(expression 15)}$$

Thus, $BU_{i,j}$ and $BL_{i,j}$ as shown in FIG. 11 have been calculated, and then, the frame compensation rate at the side of overflow ($RF_{max}$) is set at "1" and the frame compensation rate ($RF_{min}$) at the side of underflow is set at "1" (S33). These $RF_{max}$ and $RF_{min}$ are parameters used for compensating the coded quantity for every frame and in the initial stage, they are set at "1" (namely, showing no compensation).

As shown in FIG. 11A, the value of the target (ideal) line between the buffer occupation rate (%) of the initial frame and the buffer occupation rate (%) of the final frame within one GOP is calculated (S34). For example, when the VBV buffer occupation rate of the initial frame of the ith GOP is defined as $BU_{i,o}$ and the VBV buffer occupation rate of the final frame of the ith GOP (the total number of frames of the ith GOP ($NG_i$)-1) is defined as $BU_{i,NGi-1}$, the value of the target line ($K_j$) of the jth frame of the ith GOP can be calculated by the following formula (expression 16).

$$K_j=BU_{i,o}+(BU_{i,NGi-1}-BU_{i,o})\cdot j/(NG_i-1) \qquad \text{(expression 16)}$$

Next, it is checked whether there is a frame whose VBV buffer occupation rate (%) after frame data occurrence calculated in Step S32 is larger than the predetermined frame upper limit (LUF) of the VBV buffer occupation rate (%) (whether there is an overflowing frame or not) (S35). The frame compensation rate ($RF_{max}$) is calculated as for all the frames judged to be overflowing, and the maximum frame compensation rate ($RF_{max}$) of them is set as new frame compensation rate ($RF_{max}$) (S36). The maximum frame compensation rate ($RF_{max}$) can be calculated by the following formula (expression 17).

$$RF_{max}=\max((BU_{i,j}-K_j)/(LUF-K_j)) \qquad \text{(expression 17)}$$

It is checked whether there is a frame whose VBV buffer occupation rate (%) before frame data occurrence calculated in Step S32 is smaller than the predetermined frame lower limit (LLF) of the VBV buffer occupation rate (%) (whether there is an underflowed frame) (S37). The frame compensation rate ($RF_{min}$) is calculated as for all the frames judged to be underflowing, and the maximum frame compensation rate ($RF_{min}$) of them is set as new frame compensation rate ($RF_{min}$) (S38). The maximum frame compensation rate ($RF_{min}$) can be calculated by the following formula (expression 18).

$$RF_{min}=\max((K_j-BL_{i,j})/(K_j-LLF)) \qquad \text{(expression 18)}$$

In FIG. 11A, though the jth frame of the ith GOP is underflowing, "$(K_j-BL_{i,j})/(K_j-LLF)$" of the formula (expression 18) corresponds to "a/b" of FIG. 11B. The largest value, of "a/b" of the frames within the same GOP (restricted to the underflowing frames) is set as $RF_{min}$.

It is judged whether there is a frame satisfying the condition such that the VBV buffer occupation rate (%) after one frame data occurrence is larger than the value of the target line ($K_j$) and that the VBV buffer occupation rate (%) before the next frame data occurrence is also larger than the value of the target line ($K_j$) (S39). For example, it is judged whether there is the jth frame satisfying the condition that $BU_{i,j}>K_j$ and $BL_{i,j+1}>K_{j+1}$. When it is judged that there is such a frame, the VBV buffer occupation rate (%) after the frame data occurrence is compensated based on the frame compensation rate ($RF_{max}$) calculated in Step S36 (S40). For example, if such a frame is the jth frame, the VBV buffer occupation rate ($BU'_{i,j}$) after the compensated jth frame data occurrence can be calculated by the following formula (expression 19).

$$BU'_{i,j}=K_j+(BU'_{i,j}-K_j)/RF_{max} \qquad \text{(expression 19)}$$

This compensation is performed on all the frames satisfying the above condition.

It is judged whether there is a frame satisfying the condition such that the VBV buffer occupation rate (%) after one frame data occurrence is smaller than the value of the target line ($K_j$) and that the VBV buffer occupation rate (%) before the next frame data occurrence is also smaller than the value of the target line ($K_j$) (S41). For example, it is judged whether there is the jth frame satisfying the condition that $BU_{i,j}<K_j$ and $L_{i,j+1}<K_{j+1}$. When it is judged that there is such a frame, the VBV buffer occupation rate (%) before the next frame data occurrence is compensated based on the frame compensation rate ($RF_{min}$) calculated in Step S38 (S42). For example, if such a frame is the jth frame, the VBV buffer occupation rate ($BL'_{i,j+1}$) before the compensated (j+1)th frame data occurrence can be calculated by the following formula (expression 20).

$$BL'_{i,j+1}=K_{j+1}-(K_{j+1}-BL_{i,j+1})/RF_{min} \qquad \text{(expression 20)}$$

Namely, as shown in FIG. 11C, the VBV buffer occupation rate (%) of the respective frames later than the initial frame is proportionally compensated by $RF_{min}$=b/a.

The relationship between $BU'_{i,j}$ and $BL'_{i,j+1}$ is expressed by the formula (expression 21).

$$BU'_{i,j}=BL'_{i,j+1}+R/B \qquad \text{(expression 21)}$$

Though the processing shown in FIG. 10 is performed on all the GOPs within the sequence, the above compensation is not performed on GOP judged to be neither overflowing nor underflowing in Step S37.

Thus, the VBV buffer occupation rate (%) of the respective frames later than the initial frame of the GOP has been compensated and based on the compensation result, the assignment code quantity of the respective frames later than the initial frame of the GOP is calculated (S43). For example, the assignment code quantity of the jth frame of the ith GOP ($TF'_{i,j}$) can be calculated by the following formula (expression 22).

$$TF'_{i,j}=R+(BL_{i,j+1}-BL_{i,j}) \cdot B=R+(BU_{i,j}-BU_{i,j-1}) \cdot B \quad \text{(expression 22)}$$

The compensated $BL'_{i,j+1}$ and $BL'_{i,j}$ are used for $BL_{i,j+1}$ and $BL_{i,j}$ if having been compensated in Step S42, and $BL_{i,j+1}$ and $BL_{i,j}$ calculated in Step S32 are used if not having been compensated. The compensated $BU'_{i,j}$ and $BU'_{i,j-1}$ are used for $BU_{i,j}$ and $BU_{i,j-1}$ if having been compensated in Step S40, and $BU_{i,j}$ and $BU_{i,j-1}$ calculated in Step S32 are used if not having been compensated.

In these ways, in the third stage, the coded quantity is compensated in every frame and the optimum code quantity is assigned to each frame (excluding the initial frame). Thus, overflow and underflow for every frame can be completely prevented.

As described in the above, the code assignment calculating unit 53d performs the compensation of the above three stages and the optimum code quantity assignment, and then supplies this code quantity to the quantization controlling unit 55 as the rate signal Sr. As mentioned above, the coding unit 52 quantizes the transform signal Sd by the quantizing scale decided based on the rate signal Sr supplied from the quantization controlling unit 55, so to create and supply a video stream.

Thus created video stream can avoid overflow and underflow when it is decoded by the MPEG decoder, and it can reproduce an image of high quality.

Figure 12:
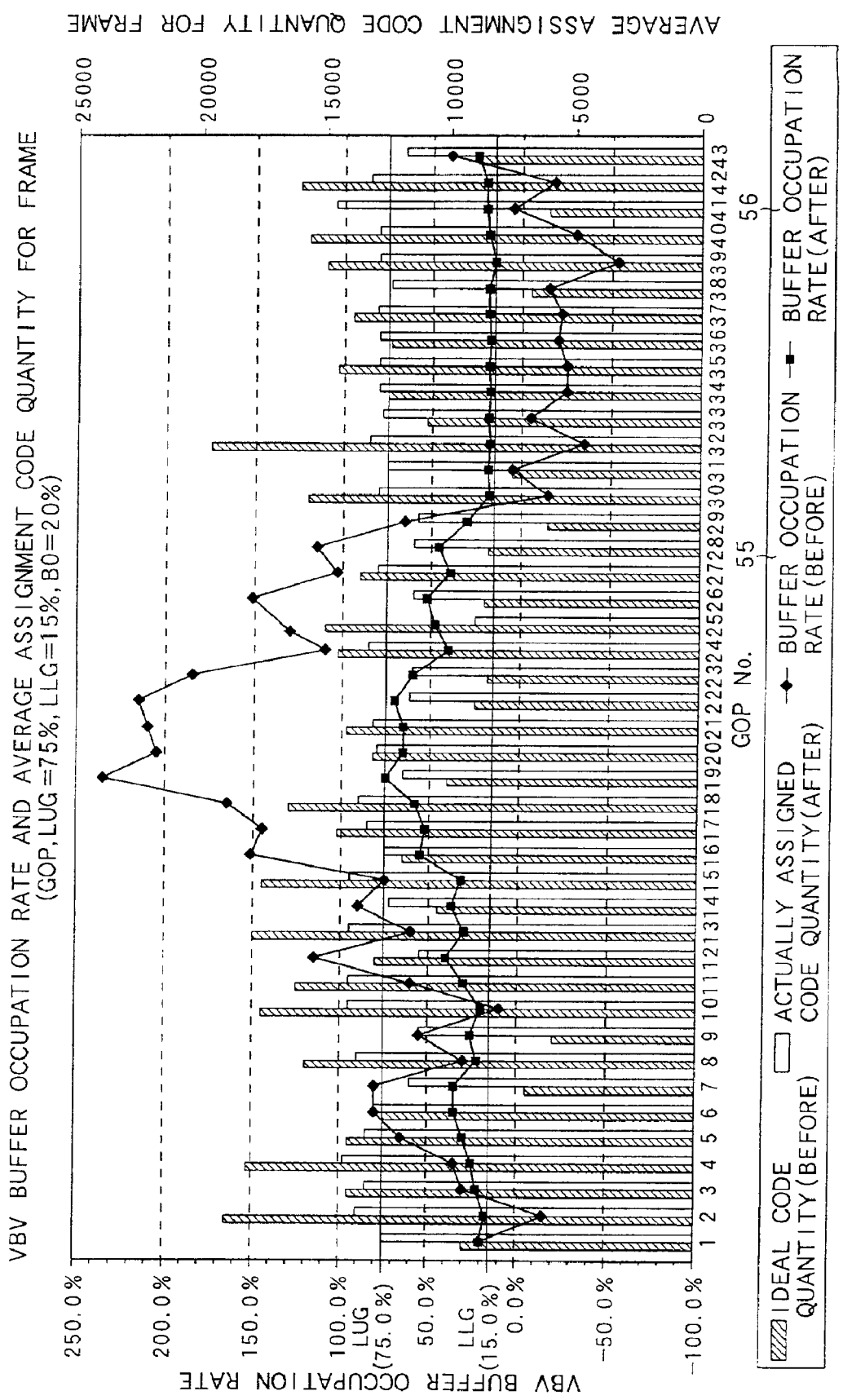
FIG. 12 is a graph showing a VBV buffer occupation rate (%) and an assignment code quantity (bits) before and after compensation in every GOP.
Figure 13:
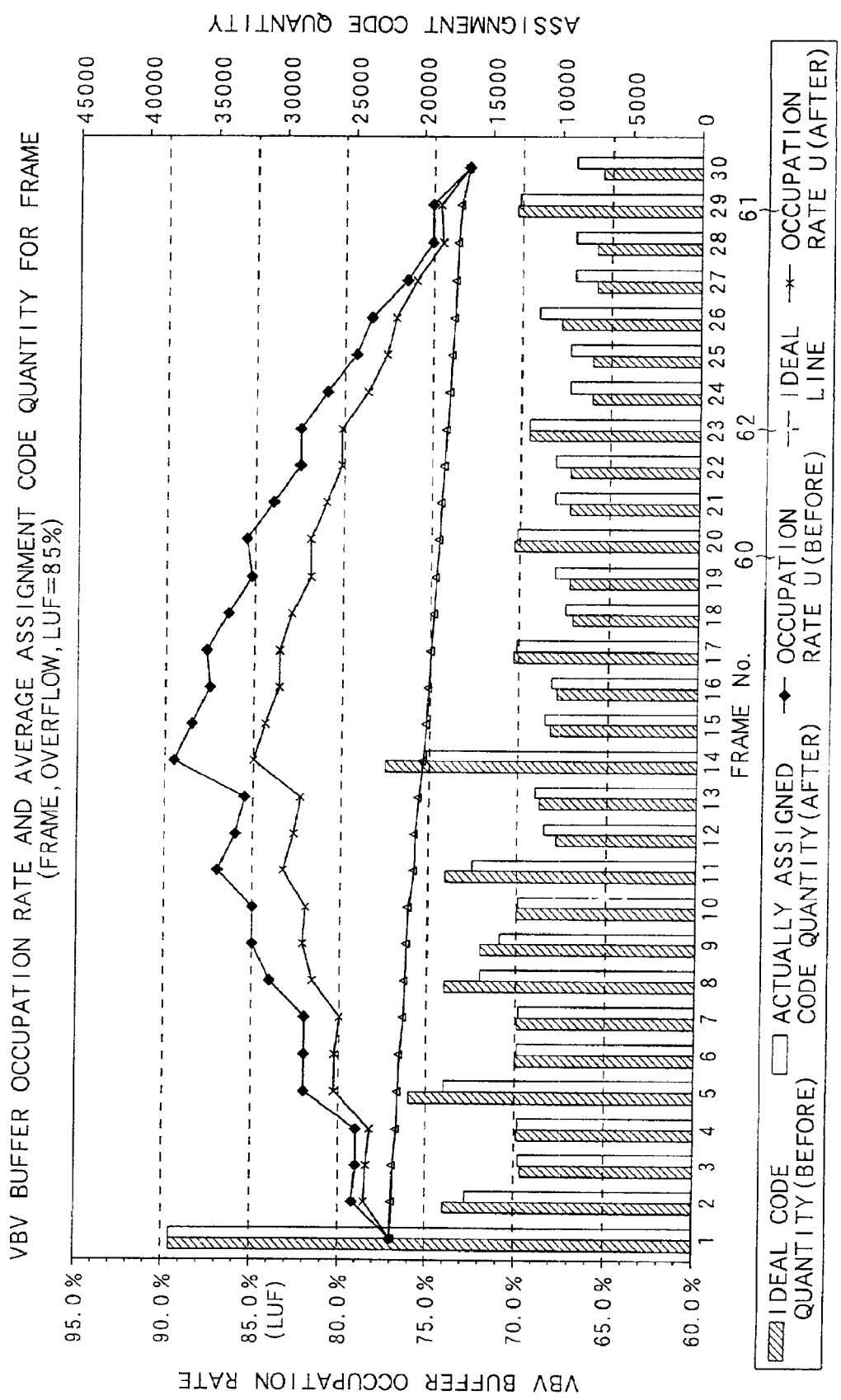
FIG. 13 is a graph showing the VBV buffer occupation rate (%) and assignment code quantity (bits) before and after compensation, in every frame, and relating to the compensation on the side of overflow.
Figure 14:
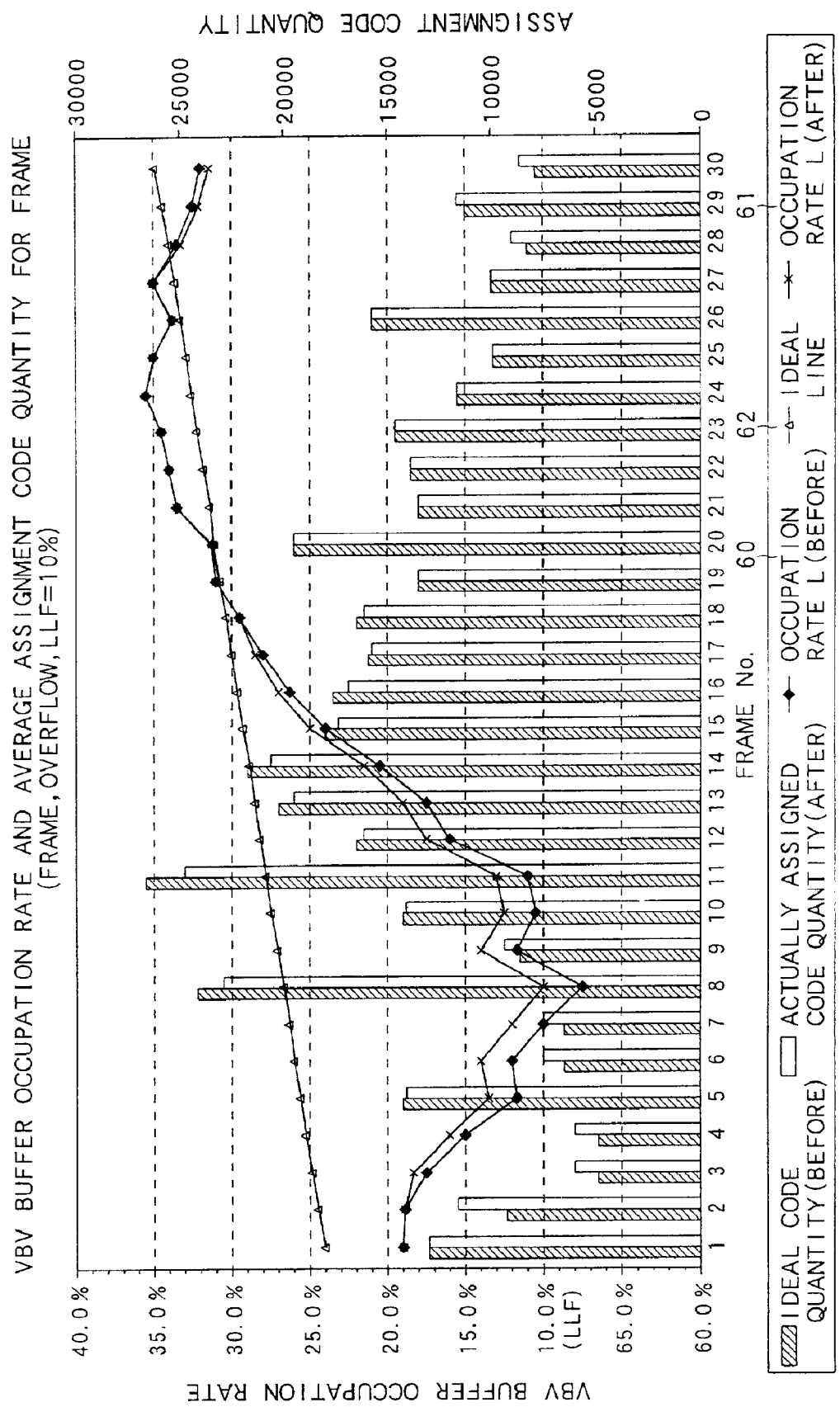
FIG. 14 is a graph showing the VBV buffer occupation rate (%) and assignment code quantity (bits) before and after compensation, in every frame, and relating to the compensation on the side of underflow.

FIGS. 12 to 14 show the simulation result of the above compensation. FIG. 12 shows the assignment code quantity (bits) and the VBV buffer occupation rate (%) before and after compensation in every GOP. In FIG. 12, though the buffer occupation rate 55 before compensation shows that there are some GOPs out of the range of the GOP upper limit (LUG=75%) of the buffer occupation rate to the GOP lower limit (LLG=15%) of the buffer occupation rate and that there occurs overflow and underflow, it is found that the buffer occupation rate 56 after compensation is within this range. FIG. 13 shows the assignment code quantity (bits) and the VBV buffer occupation rate (%) before and after compensation, by every frame, and it relates to the compensation at the side of overflow. FIG. 14 shows the assignment code quantity (bits) and the VBV buffer occupation rate (%) before and after compensation, by every frame, and it relates to the compensation at the side of underflow. On view of both FIGS. 13 and 14, though the buffer occupation rate 60 before compensation shows that there are some frames out of the range of the frame upper limit (LUF=85%) of the buffer occupation rate shown in FIG. 13 to the frame lower limit (LLG=15%) of the buffer occupation rate shown in FIG. 14 and that there occurs overflow and underflow, it is found that the buffer occupation rate 61 after compensation is within this range. It is also found that such compensation is performed with the ideal line 62 as a reference.

Although the compensation of the above three stages is performed and the optimum code quantity is assigned in the above embodiment, the present invention is not restricted to this, but for example only the above first stage compensation (compensation of the coded quantity for every GOP) may be performed so to assign the optimum code quantity. Further, only the above second stage compensation (compensation of the coded quantity of the initial frame) and the above third stage compensation (compensation of the coded quantity for every frame) may be performed so to assign the optimum code quantity.

Though the titles of the I picture, P picture, B picture, and GOP are used in the MPEG-1 and MPEG-2 in the above embodiment, the same functions can be realized by replacing the I picture with I-VOP (Video Object Plane), the P picture with P-VOP, the B picture with B-VOP, and the GOP with GOV (Group Of VOP) in the case of the MPEG-4. The image group having a predetermined number of image frames includes the GOV.

As set forth hereinabove, the present invention can assign the optimum code quantity with no overflow nor underflow by performing compensation of three stages on the coded quantity calculated based on the image complexity index of each frame and each image group forming a video sequence. Further, since the coded quantity of the initial frame can be compensated at minimum and the coded quantity of the initial frame can be maintained as it is as much as possible, the present invention can assure a finer image.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. 2000-174064 filed on Jun. 9, 2000 including the specification, claims, drawings and summary is incorporated herein by reference in its entirety.

What is claimed is:

1. A code quantity assignment apparatus for encoding a video signal and storing the video signal into a storage medium in compression encode data storing system, the apparatus comprising:

an image group code quantity assignment device for assigning code quantity for every image group so that buffer occupation rate of an image group having a predetermined number of image frames included in a video signal is within the range of predetermined u per limit and lower limit of the buffer occupation rate;

a first frame code quantity assignment device for assigning code quantity to an initial frame so that the buffer occupation rate of the initial frame within the image group does not exceed the predetermined upper limit of the buffer occupation rate; and a second frame code quantity assignment device for assigning code quantity to a frame later than the initial frame within the image group, based on the code quantity assigned by said image group code quantity assignment device and first frame code quantity assignment device.

2. The code quantity assignment apparatus according to claim 1, wherein the first frame code quantity assignment device assigns code quantity to the initial frame so that the calculated buffer occupation rate of the initial frame is within the range of the predetermined upper limit and lower limit of the buffer occupation rate.

3. A code quantity assignment apparatus for encoding a video signal and storing the video signal into a storage medium in compression encode data storing system, the apparatus comprising:

an image group buffer occupation rate calculation device for calculating target coded quantity of an image group having a predetermined number of image frames included in the video signal, based on image complexity index of each image group, and calculating the buffer occupation rate of each image group;

an image group code quantity assignment device for compensating the buffer occupation rate of the image group so that the calculated buffer occupation rate of the image group is within the range of the predetermined upper limit and lower limit of the buffer occupation rate, and assigning code quantity for every image group;

a first frame buffer occupation rate calculation device for calculating target coded quantity of the initial frame within the image group to which the code quantity has been assigned, based on the image complexity index of each initial frame, and calculating the buffer occupation rate of each initial frame;

a first frame code quantity assignment device for compensating the buffer occupation rate of the initial frame so that the calculated buffer occupation rate of the initial frame does not exceed the predetermined upper limit of the buffer occupation rate, and assigning code quantity to the initial frame;

a second frame buffer occupation rate calculation device for calculating target coded quantity of a frame later than the initial frame within the image group to which the code quantity has been assigned, based on the image complexity index of each frame, and calculating the buffer occupation rate of each frame; and a second frame code quantity assignment device for compensating the buffer occupation rate of a frame later than the initial frame so that the calculated buffer occupation rate of the frame later than the initial frame is within the range of the predetermined upper limit and lower limit of the buffer occupation rate, and assigning code quantity to the frame, wherein the target coded quantity of the image group is calculated on the basis of the ratio of the total of the image complexity indexes of the respective frames included in the image group and the total of the image complexity indexes of the respective image upper included in the video signal.

4. A code quantity assignment apparatus for encoding a video signal and storing the video signal into a storage medium in compression encode data storing system, the apparatus comprising:

an image group buffer occupation rate calculation device for calculating target coded quantity of an image group having a predetermined number of image frames included in the video signal, based on image complexity index of each image group, and calculating the buffer occupation rate of each image group;

an image group code quantity assignment device for compensating the buffer occupation rate of the image group so that the calculated buffer occupation rate of the image group is within the range of the predetermined upper limit and lower limit of the buffer occupation rate, and assigning code quantity for every image group;

a first frame buffer occupation rate calculation device for calculating target coded quantity of the initial frame within the image group to which the code quantity has been assigned, based on the image complexity index of each initial frame, and calculating the buffer occupation rate of each initial frame;

a first frame code quantity assignment device for compensating the buffer occupation rate of the initial frame so that the calculated buffer occupation rate of the initial frame does not exceed the predetermined upper limit of the buffer occupation rate, and assigning code quantity to the initial frame;

a second frame buffer occupation rate calculation device for calculating target coded quantity of a frame later than the initial frame within the image group to which the code quantity has been assigned, based on the image complexity index of each frame, and calculating the buffer occupation rate of each frame; and a second frame code quantity assignment device for compensating the buffer occupation rate of a frame later than the initial frame so that the calculated buffer occupation rate of the frame later than the initial frame is within the range of the predetermined upper limit and lower limit of the buffer occupation rate, and assigning code quantity to the frame, wherein the image group code quantity assignment device:

judges whether the calculated buffer occupation rate of each image group is larger than the predetermined upper limit of the buffer occupation rate or not and whether it is smaller than the predetermined lower limit of the buffer occupation rate or not;

calculates the ratio of the buffer occupation rate of the image group an the predetermined upper limit of the buffer occupation rate as an image group upper limit compensation ratio, as for an image group whose buffer occupation rate is larger than the upper limit;

calculates the ratio of the buffer occupation rate of the image group an the predetermined lower limit of the buffer occupation rate as an image group lower limit compensation ratio, as for an image group whose buffer occupation rate is smaller than the lower limit;

multiplies the maximum image group upper limit compensation ratio of the calculated image group upper limit compensation ratios, by the buffer occupation rate of the image group larger than the initial buffer occupation rate that is a reference, for compensation;

multiplies the maximum image group lower limit compensation ratio o the calculated image group lower limit compensation ratios, by the buffer occupation rate of the image group smaller than the initial buffer occupation that is a reference, for compensation; and assigns code quantity for every image group.

5. A code quantity assignment apparatus for encoding a video signal and storing the video signal into a storage medium in compression encode data storing system, the apparatus comprising:

an image group buffer occupation rate calculation device for calculating target coded quantity of an image group having a predetermined number of image frames included in the video signal, based on image complexity index of each image group, and calculating the buffer occupation rate of each image group;

an image group code quantity assignment device for compensating the buffer occupation rate of the image group so that the calculated buffer occupation rate of the image group is within the range of the predetermined upper limit and lower limit of the buffer occupation rate, and assigning code quantity for every image group;

a first frame buffer occupation rate calculation device for calculating target coded quantity of the initial frame within the image group to which the code quantity has been assigned, based on the image complexity index of each initial frame, and calculating the buffer occupation rate of each initial frame;

a first frame code quantity assignment device for compensating the buffer occupation rate of the initial frame so that the calculated buffer occupation rate of the initial frame does not exceed the predetermined upper limit of the buffer occupation rate, and assigning code quantity to the initial frame;

a second frame buffer occupation rate calculation device for calculating target coded quantity of a frame later than the initial frame within the image group to which he code quantity has been assigned, based on the image complexity index of each frame, and calculating the buffer occupation rate of each frame; and a second frame code quantity assignment device for compensating the buffer occupation rate of a frame later than the initial frame so that the calculated buffer occupation rate of the frame later than the initial frame is within the range of the predetermined upper limit and lower limit of the buffer occupation rate, and assigning code quantity to the frame, wherein the first frame code quantity assignment device:

judges whether the calculated buffer occupation rate of the initial frame is larger than the predetermined upper limit of the buffer occupation rates;

compensates the buffer occupation rate of the initial frame so as to be equal to the predetermined upper limit of the buffer occupation rate when the rate is larger than the upper limit; and assigns code quantity to the initial frame.

6. A code quantity assignment apparatus for encoding a video signal and storing the video signal into a storage medium in compression encode data storing system, the apparatus comprising:

an image group buffer occupation rate calculation device for calculating target coded quantity of an image group having a predetermined number of image frames included in the video signal, based on image complexity index of each image group, and calculating the buffer occupation rate of each image group;

an image group code quantity assignment device for compensating the buffer occupation rate of the image group so that the calculated buffer occupation rate of the image group is within the range of the predetermined upper limit and lower limit of the buffer occupation rate, and assigning code quantity for every image group;

a first frame buffer occupation rate calculation device for calculating target coded quantity of the initial frame within the image group to which the code quantity as been assigned, based on the image complexity index of each initial frame, and calculating the buffer occupation rate of each initial frame;

a first frame code quantity assignment device for compensating the buffer occupation rate of the initial frame so that the calculated buffer occupation rate of the initial frame does not exceed the predetermined upper limit of the buffer occupation rate, and assigning code quantity to the initial frame;

a second frame buffer occupation rate calculation device for calculating target coded quantity of a frame later than the initial frame within the image group to which the code quantity has been assigned, based on the image complexity index of each frame, and calculating the buffer occupation rate of each frame; and a second frame code quantity assignment device for compensating the buffer occupation rate of a frame later than the initial frame so that the calculated buffer occupation rate of the frame later than the initial frame is within the range of the predetermined upper limit and lower limit of the buffer occupation rate, and assigning code quantity to the frame, wherein the first frame code quantity assignment device:

judges whether the calculated buffer occupation rate of the initial frame is smaller than the predetermined lower limit of the buffer occupation rate;

compensates the buffer occupation rate of the initial frame so as to be equal to the predetermined lower limit of the buffer occupation rate when the rate is smaller than the lower limit; and assigns code quantity to the initial frame.

7. A code quantity assignment apparatus for encoding a video signal and storing the video signal into a storage medium in compression encode data storing system, the apparatus comprising:

an image group buffer occupation rate calculation device for calculating target coded quantity of an image group having a predetermined number of image frames included in the video signal, based on image complexity index of each image group, and calculating the buffer occupation rate of each image group;

an image group code quantity assignment device for compensating the buffer occupation rate of the image group so that the calculated buffer occupation rate of the image group is within the range of the predetermined upper limit and lower limit of the buffer occupation rate, and assigning code quantity for every image group;

a first frame buffer occupation rate calculation device for calculating target coded quantity of the initial frame within the image group to which the code quantity has been assigned, based on the image complexity index of each initial frame, and calculating the buffer occupation rate of each initial frame;

a first frame code quantity assignment device for compensating the buffer occupation rate of the initial frame so that the calculated buffer occupation rate of the initial frame does not exceed the predetermined upper limit of the buffer occupation rate, and assigning code quantity to the initial frame;

a second frame buffer occupation rate calculation device for calculating target coded quantity of a frame later than the initial frame within the image group to which the code quantity has been assigned, based on the image complexity index of each frame, and calculating the buffer occupation rate of each frame; and a second frame code quantity assignment device for compensating the buffer occupation rate of a frame later than the initial frame so that the calculated buffer occupation rate of the frame later than the initial frame is within the range of the predetermined upper limit and lower limit of the buffer occupation rate, and assigning code quantity to the frame, wherein the second frame code quantity assignment device:

judges whether the calculated buffer occupation rate of the frame later than the initial frame is larger than the predetermined upper limit of the buffer occupation rate and whether it is smaller than the predetermined lower limit of the buffer occupation rate;

calculates a first differential between the frame buffer occupation rate larger than the upper limit or the frame buffer occupation rate smaller than the lower limit an a predetermined buffer occupation rate on an ideal line;

calculates a second differential between the upper limit or lower limit of the buffer occupation rate and the predetermined buffer occupation rate on an ideal line;

calculates the ratio of the first differential and the second differential as a frame compensation ratio;

calculates the maximum frame compensation ratio of the calculated frame compensation ratios, respectively as for the upper limit and the lower limit; multiplies the frame compensation ratio by the buffer occupation rate of the frame later than the initial frame, for compensations; and assigns code quantity to the frame.

8. The code quantity assignment apparatus according to claim 7, wherein the ideal line is a line lying between the buffer occupation rate of the initial frame to which the first frame code quantity assignment device has assigned the code quantity an the buffer occupation rate of the final frame within the image group having the initial frame.

9. A code quantity assignment method for encoding a video signal and storing the video signal into a storage medium in compression encode data storing system, the method comprising the processes of:

assigning code quantity for every image group so that buffer occupation rate of an image group having a predetermined number of image frames included in a video signal is within the range of predetermined upper limit and lower limit of the buffer occupation rate;

assigning code quantity to an initial frame so that the buffer occupation rate of the initial frame within the image group does not exceed the predetermined upper limit o the buffer occupation rate; and assigning code quantity to a frame later than the initial frame within th image group, based on the code quantity assigned by said image group code quantity assignment process and initial frame code quantity assignment process.

10. A code quantity assignment method in encoding a video signal and storing the video signal into a storage medium in compression encode data storing system, the method comprising the processes of:

calculating target coded quantity of an image group having a predetermined number of image frames included in the video signal, based on image complexity index of each image group, calculating the buffer occupation rate of each image group, compensating the buffer occupation rate of the image group so that the calculated buffer occupation rate of the image group is within the range of the redetermined upper limit and lower limit of the buffer occupation rate, assigning code quantity for every image group, calculating target coded quantity of the initial frame within the image group to which the code quantity has been assigned, based on the image complexity index of each initial frame, calculating the buffer occupation rate of each initial frame, compensating the buffer occupation rate of the initial frame so that the calculated buffer occupation rate of the initial frame does not exceed the predetermined upper limit of the buffer occupation rate, assigning code quantity to the initial frame, calculating target coded quantity of a frame later than the initial frame within the image group to which the code quantity has been assigned, based on the image complexity index of each frame, calculating the buffer occupation rate of each frame, compensating the buffer occupation rate of a frame later than the initial frame so that the calculated buffer occupation rate of the frame later than the initial frame is within the range of the predetermined upper limit and lower limit of the buffer occupation rate, and assigning code quantity to the frame, wherein the target coded quantity of the image group is calculated on the basis of the ratio of the total of the image complexity indexes of the respective frames included in the image group and the total of the image complexity indexes of the respective image groups included in the video signal.

* * * * *